(12) United States Patent
Park et al.

(10) Patent No.: US 10,574,486 B2
(45) Date of Patent: Feb. 25, 2020

(54) CHANNEL MEASUREMENT METHOD IN WIRELESS COMMUNICATION SYSTEM AND APPARATUS THEREFOR

(71) Applicant: LG ELECTRONICS INC., Seoul (KR)

(72) Inventors: Haewook Park, Seoul (KR); Jonghyun Park, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 56 days.

(21) Appl. No.: 15/575,972

(22) PCT Filed: Jun. 3, 2016

(86) PCT No.: PCT/KR2016/005952
§ 371 (c)(1),
(2) Date: Nov. 21, 2017

(87) PCT Pub. No.: WO2016/200106
PCT Pub. Date: Dec. 15, 2016

(65) Prior Publication Data
US 2018/0152324 A1    May 31, 2018

Related U.S. Application Data

(60) Provisional application No. 62/172,213, filed on Jun. 7, 2015.

(51) Int. Cl.
*H04L 25/02* (2006.01)
*H04B 7/04* (2017.01)
(Continued)

(52) U.S. Cl.
CPC ........... *H04L 25/0224* (2013.01); *H04B 7/04* (2013.01); *H04B 7/06* (2013.01); *H04B 17/309* (2015.01);
(Continued)

(58) Field of Classification Search
None
See application file for complete search history.

(56) References Cited

U.S. PATENT DOCUMENTS 8,605,804 B2    12/2013  Carbonelli et al.
2004/0081074 A1*  4/2004  Piechocki ............. H04L 1/0618
370/206
(Continued)

FOREIGN PATENT DOCUMENTS

EP         3026823 A1    6/2016
KR    10-2014-0144261 A  12/2014
(Continued)

OTHER PUBLICATIONS

LG Electronics, "Discussion on partial CSI-RS-based scheme enhancements", 3GPP TSG RAN WG1 Meeting #80bis, Apr. 20-24, 2015, R1-152148.
(Continued)

*Primary Examiner* — James P Duffy
(74) *Attorney, Agent, or Firm* — Dentons US LLP

(57) ABSTRACT

A channel measurement method in a wireless communication system and an apparatus therefor are disclosed. Specifically, a method for measuring a channel by a terminal in the wireless communication system may comprise the steps of: receiving, from a base station, a reference signal on part of antenna ports within a two-dimensional antenna port array; measuring channels for the part of antenna ports on the basis of the reference signal received from the base station; and reconstructing a channel for an antenna port which is not used for transmission of the reference signal within the two-dimensional antenna port array, using the channel measurement result, to reconstruct channels for all antenna ports within the two-dimensional antenna port array.

16 Claims, 17 Drawing Sheets

(51) Int. Cl.
  *H04L 25/03* (2006.01)
  *H04B 7/06* (2006.01)
  *H04B 17/309* (2015.01)
  *H04W 24/10* (2009.01)
(52) U.S. Cl.
  CPC .......... *H04L 25/02* (2013.01); *H04L 25/0204* (2013.01); *H04L 25/03* (2013.01); *H04W 24/10* (2013.01)

(56) References Cited

U.S. PATENT DOCUMENTS

| | | |
|---|---|---|
| 2012/0288022 A1 | 11/2012 | Guey et al. |
| 2014/0003240 A1* | 1/2014 | Chen ............... H04W 28/08 370/235 |
| 2014/0098689 A1 | 4/2014 | Lee et al. |
| 2014/0307816 A1 | 10/2014 | Alex et al. |

FOREIGN PATENT DOCUMENTS

| | | |
|---|---|---|
| WO | 2014-126319 A1 | 8/2014 |
| WO | 2014166454 A1 | 10/2014 |

OTHER PUBLICATIONS

G. Auer, "3D Pilot Aided Channel Estimation", Wireless Communications and Networking Conference, IEEE, Apr. 5, 2009, pp. 1-6, XP031453981.

NTT Docomo; "Investigation on Precoding Structures for 3D MIMO"; R1-153154, 3GPP TSG RAN WG1#81; Fukuoka Japan; pp. 1-6 May 2015.

* cited by examiner

[FIG. 1]
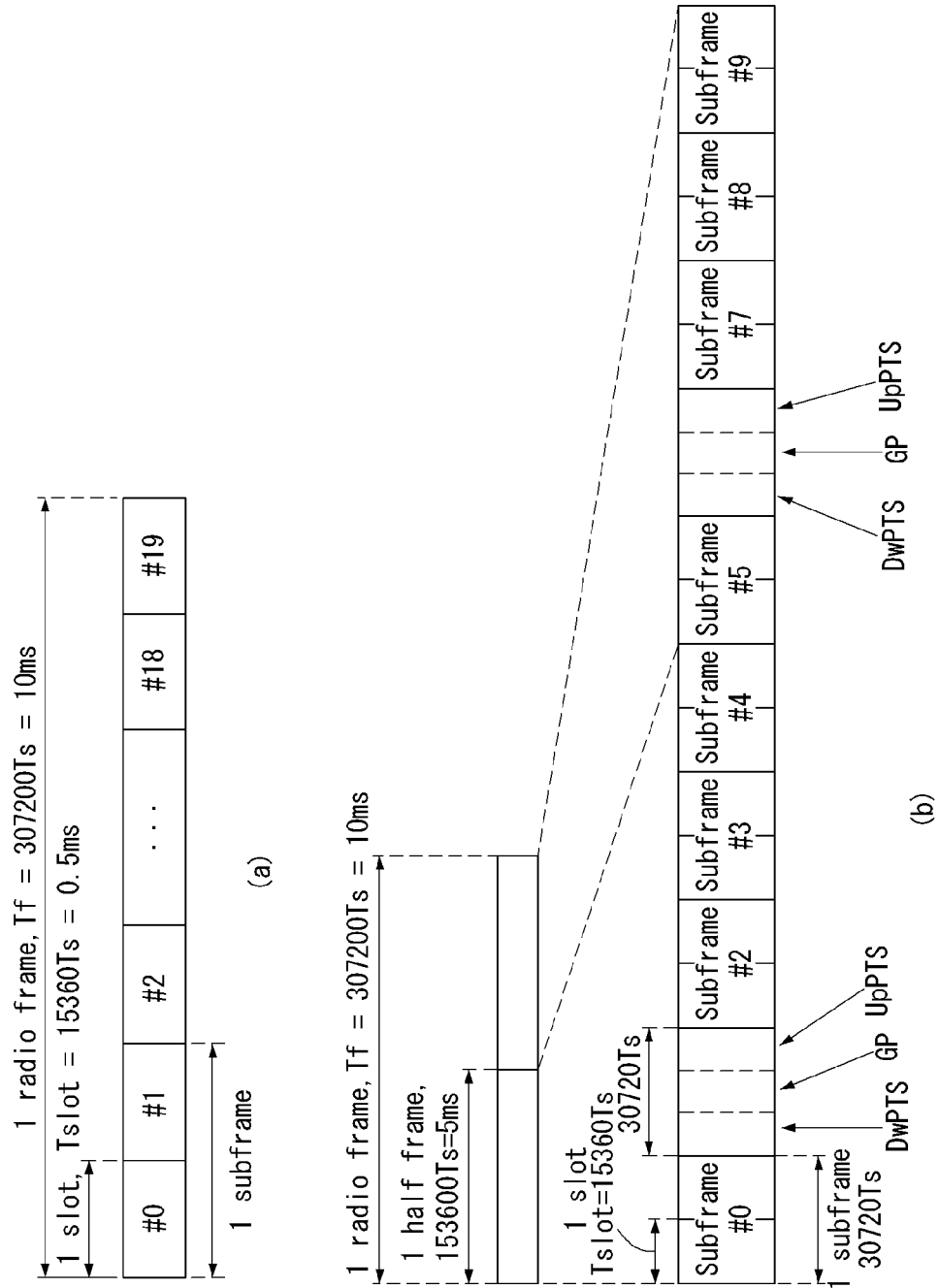

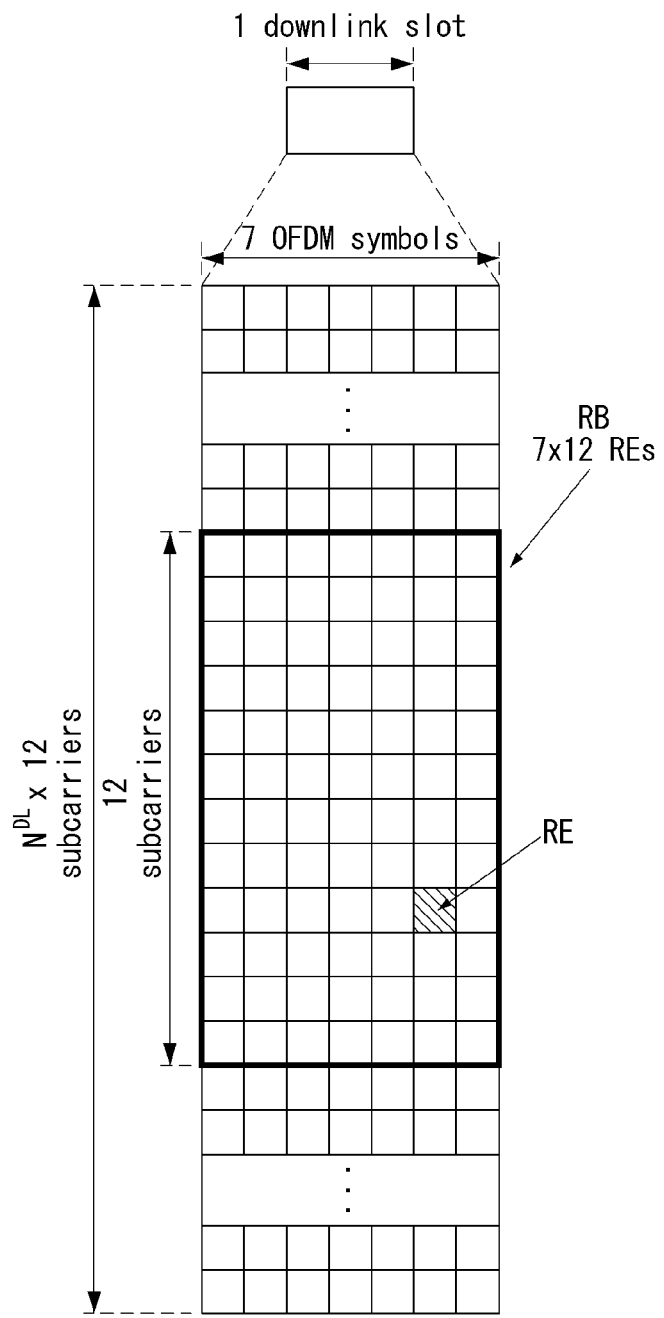
[FIG. 2]

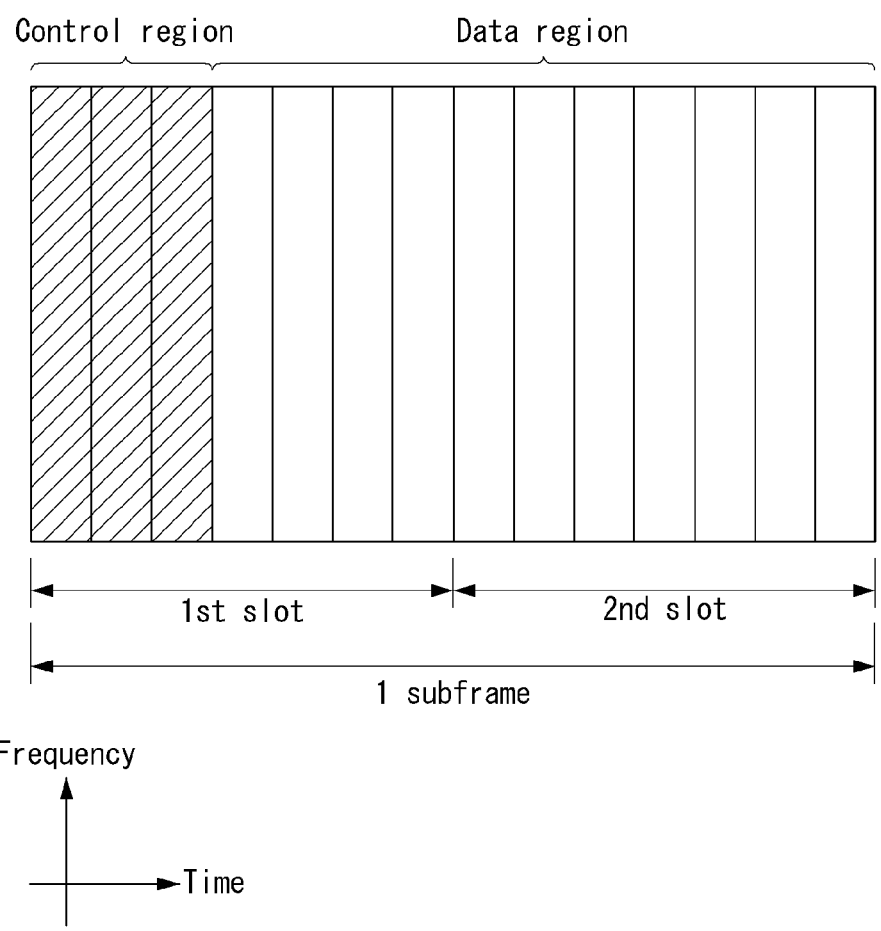
[FIG. 3]

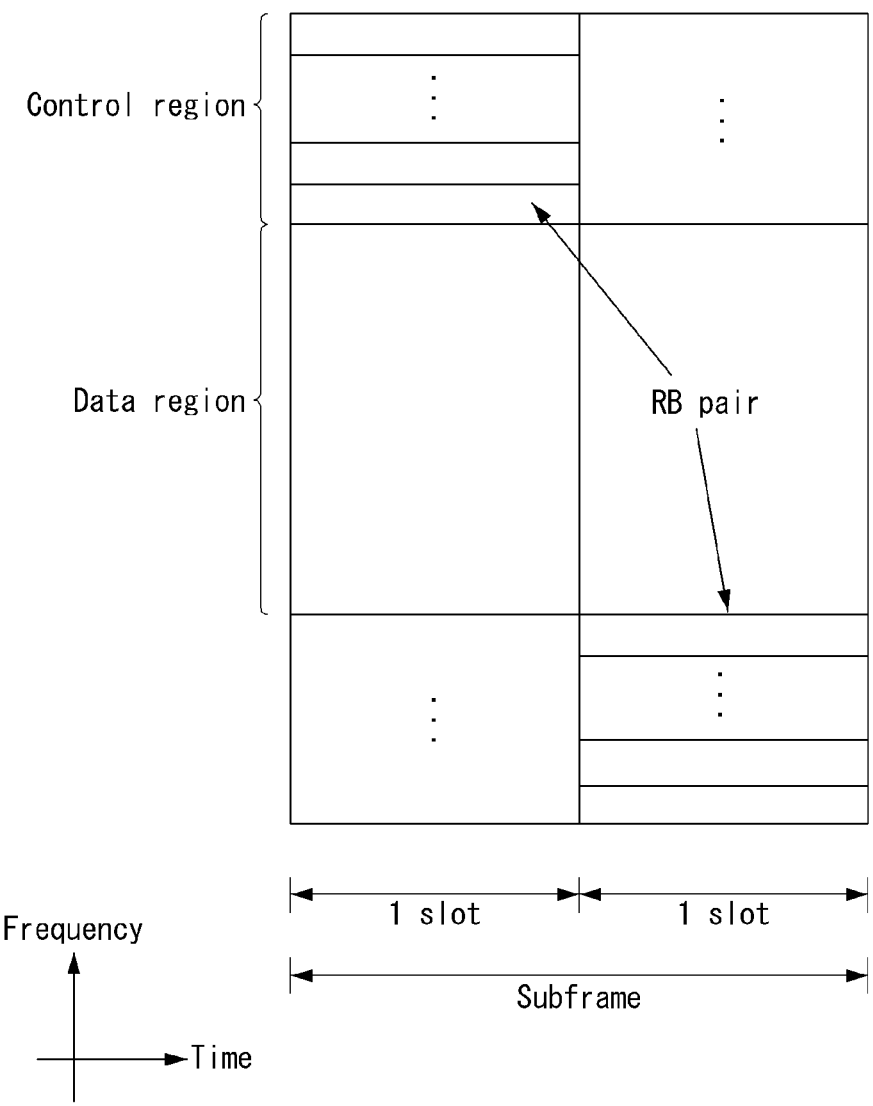

[FIG. 5]
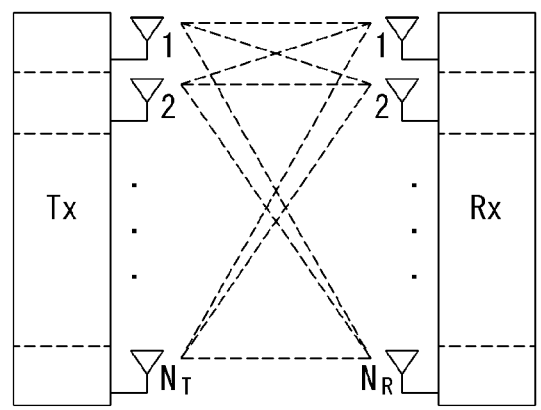
[FIG. 6]
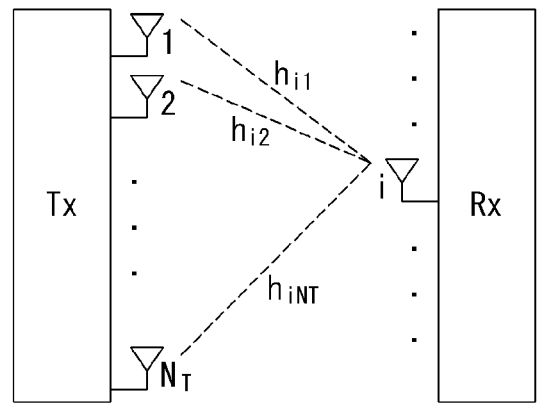

[FIG. 7]
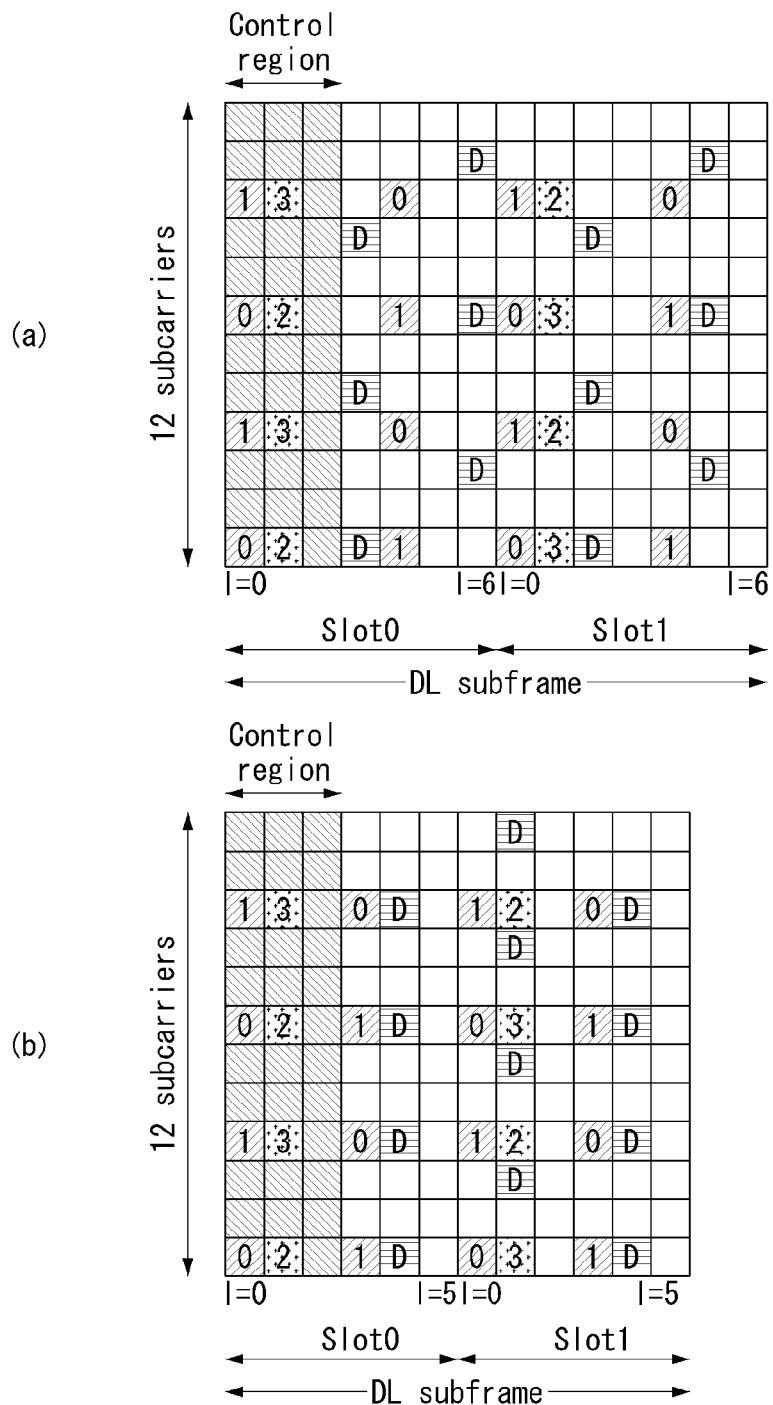

[FIG. 8]
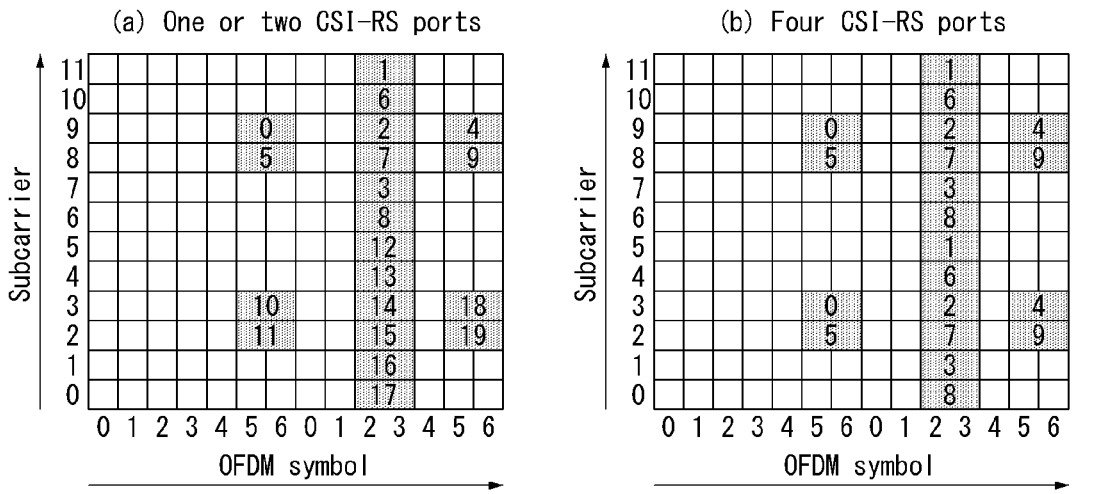
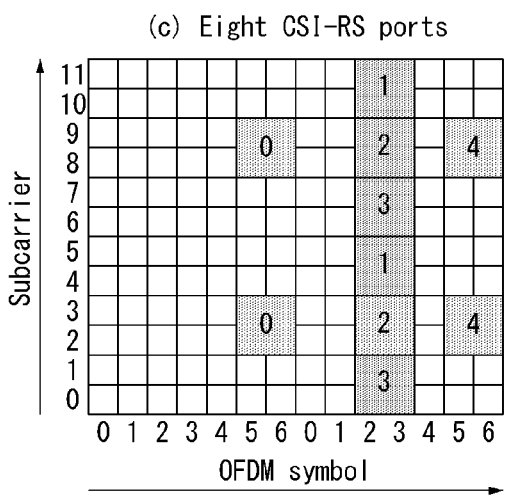

[FIG. 9]
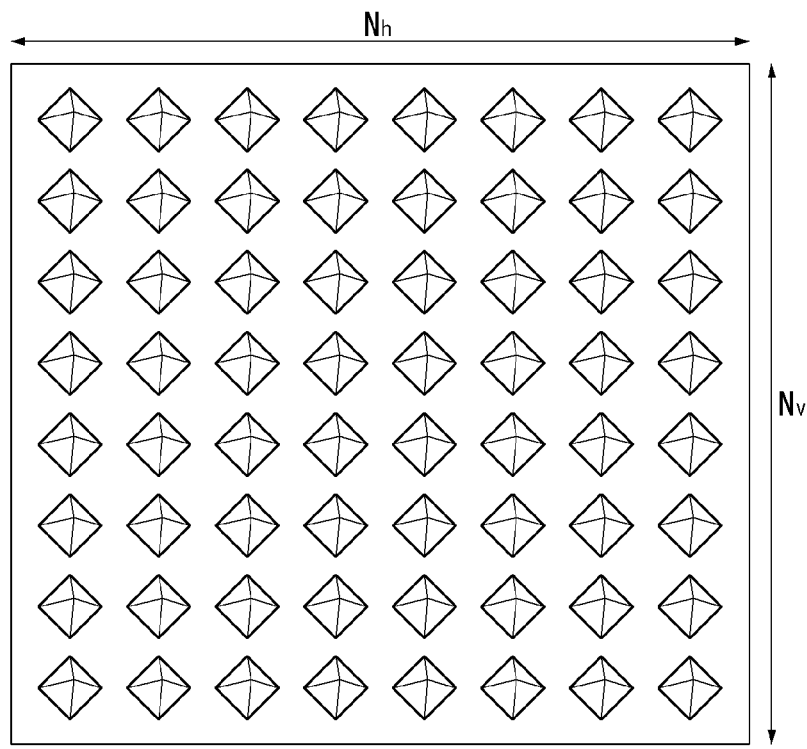
[FIG. 10]
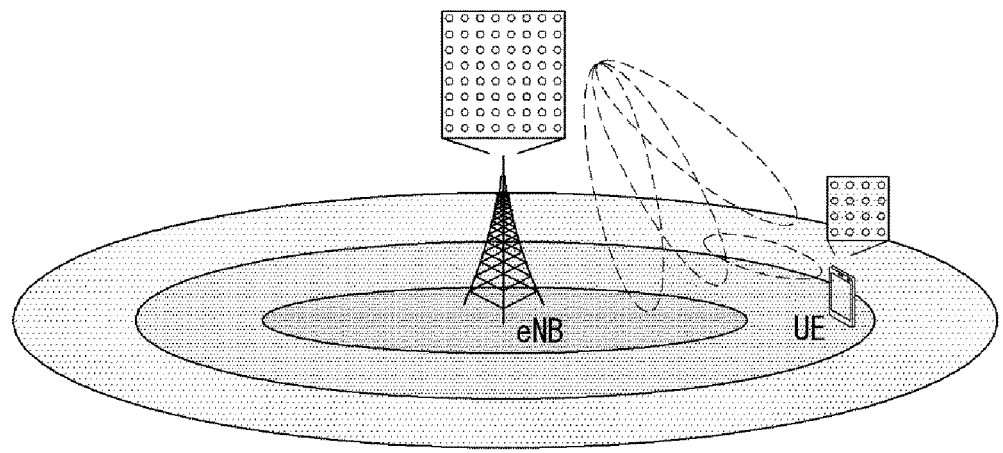

[FIG. 11]
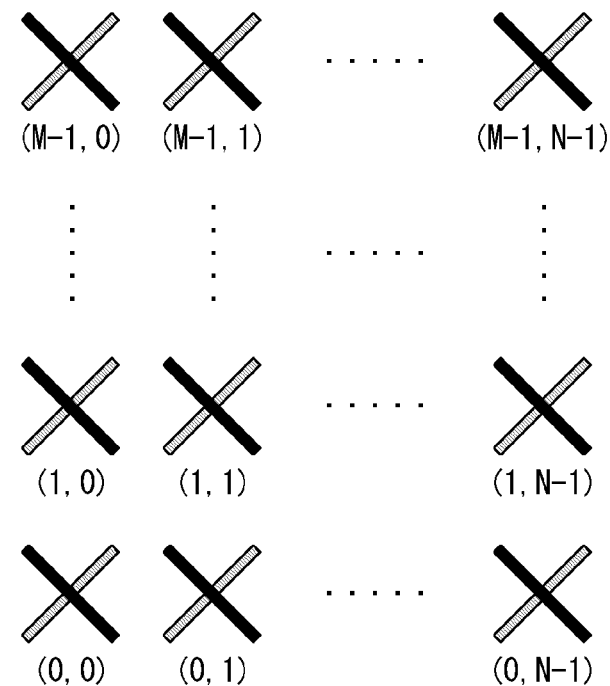

[FIG. 12]
(a)
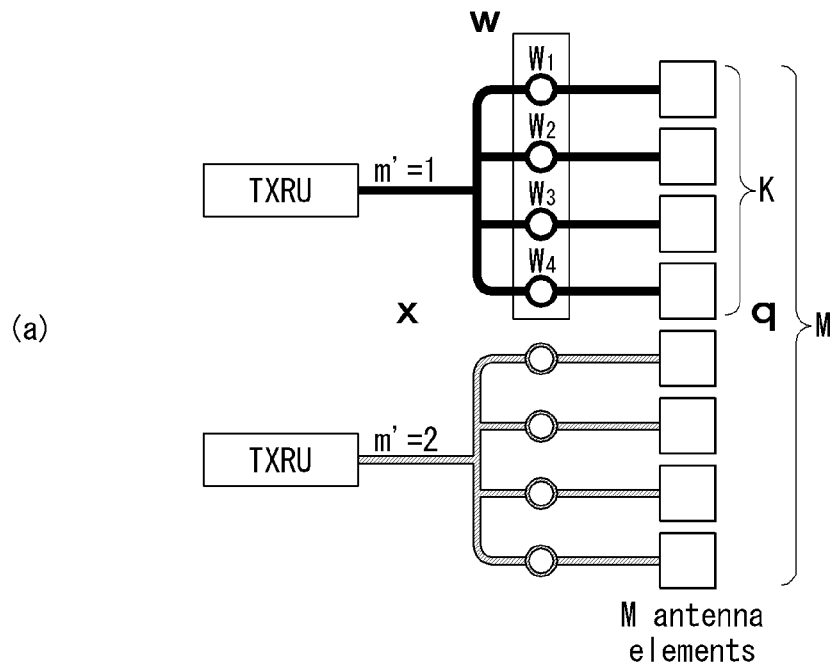
(b)
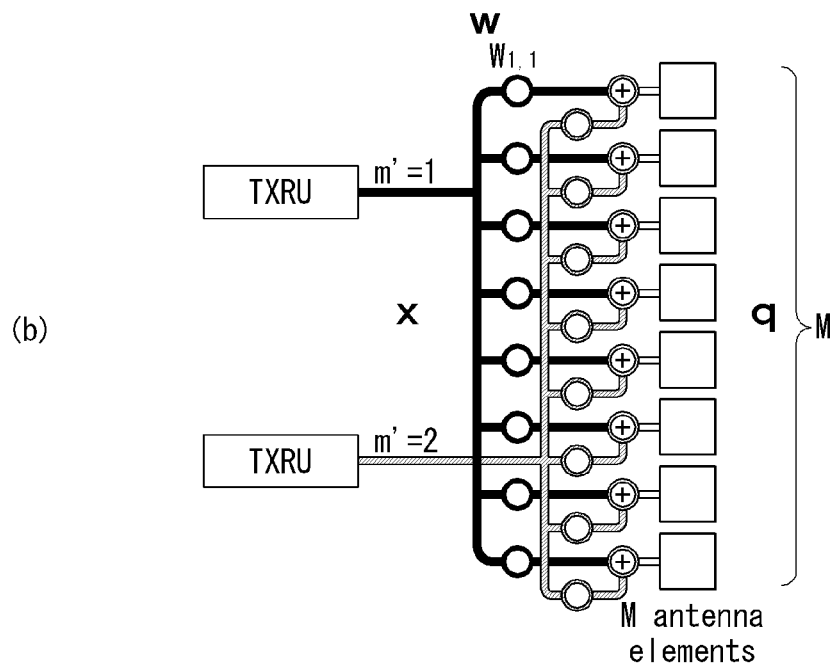

[FIG. 13]
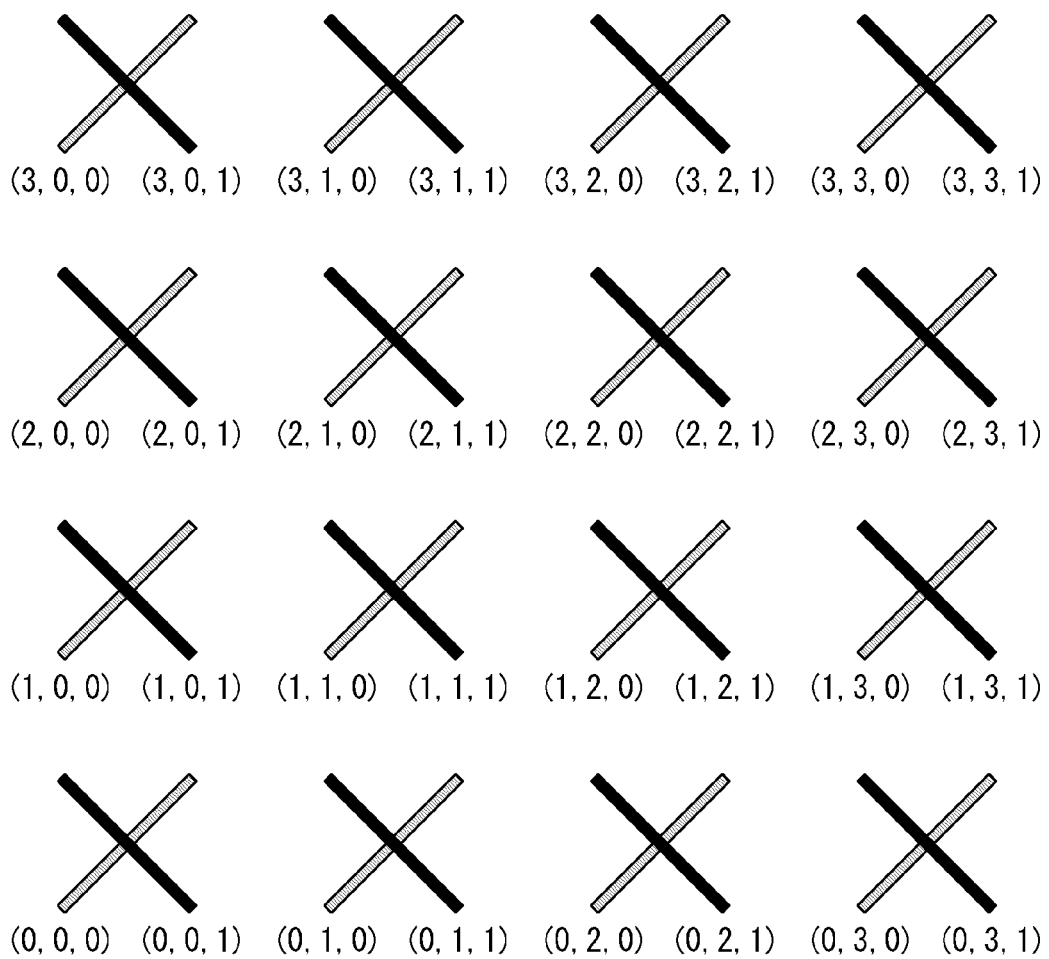

[FIG. 14]
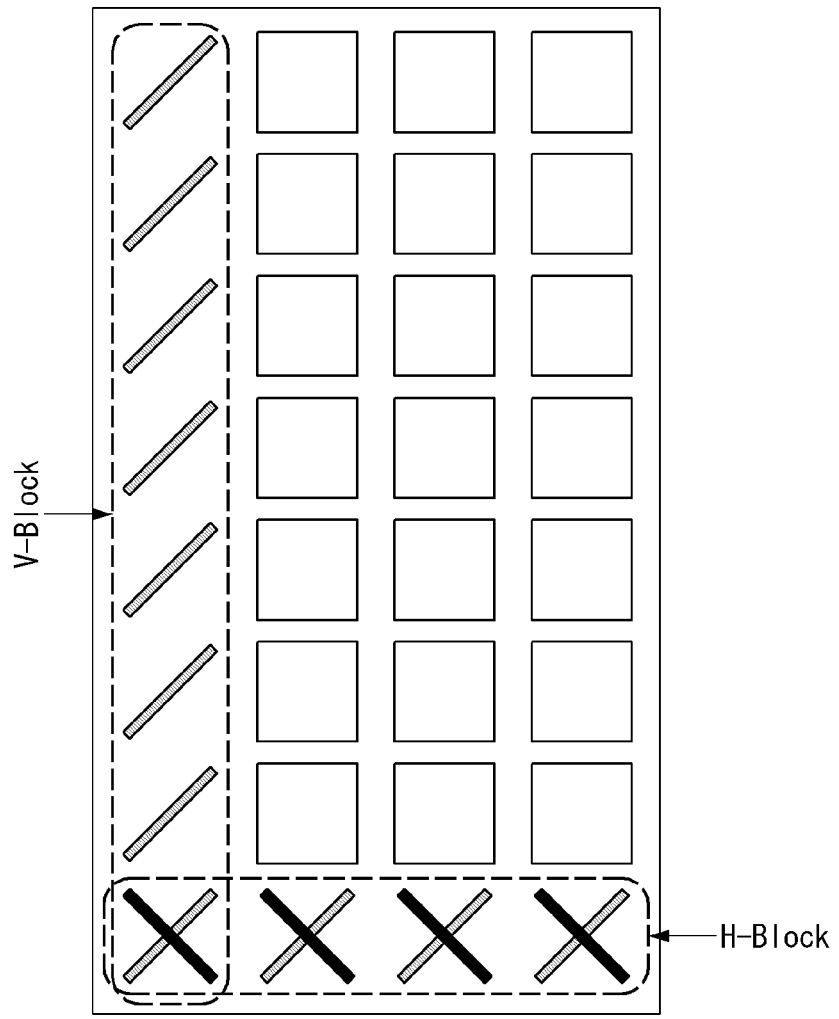
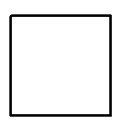 : Antenna ports which are not mapped to CSI-RS in both polarizations

[FIG. 15]
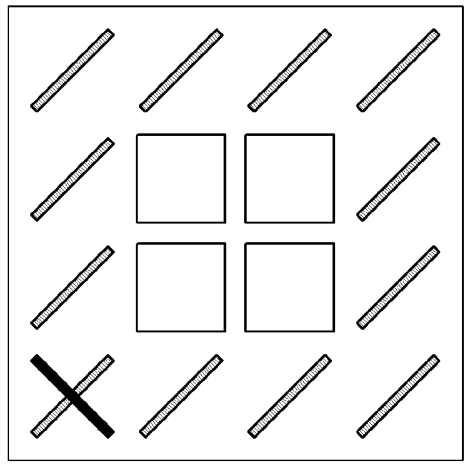
(a) Option 1
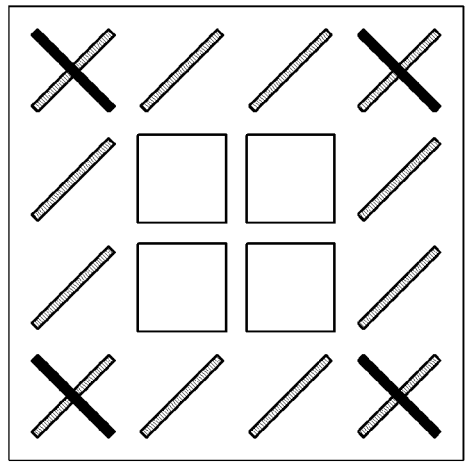
(b) Option 2
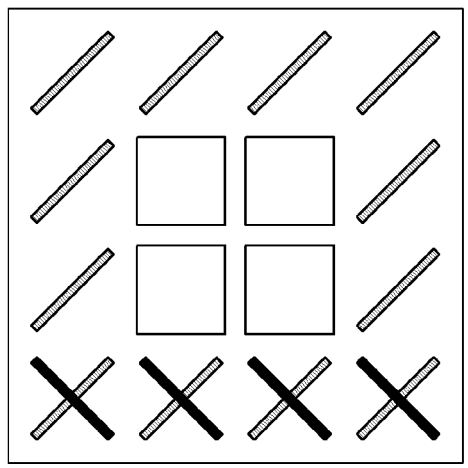
(c) Option 3
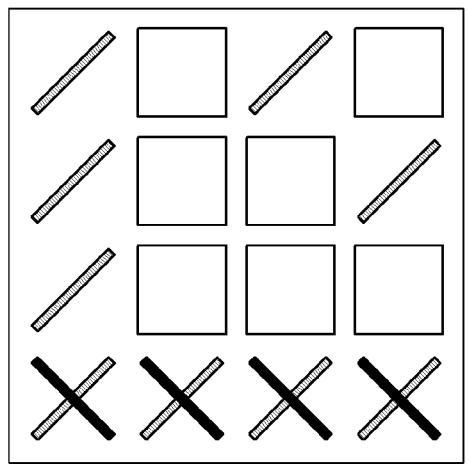
(d) Option 4

【FIG. 16】
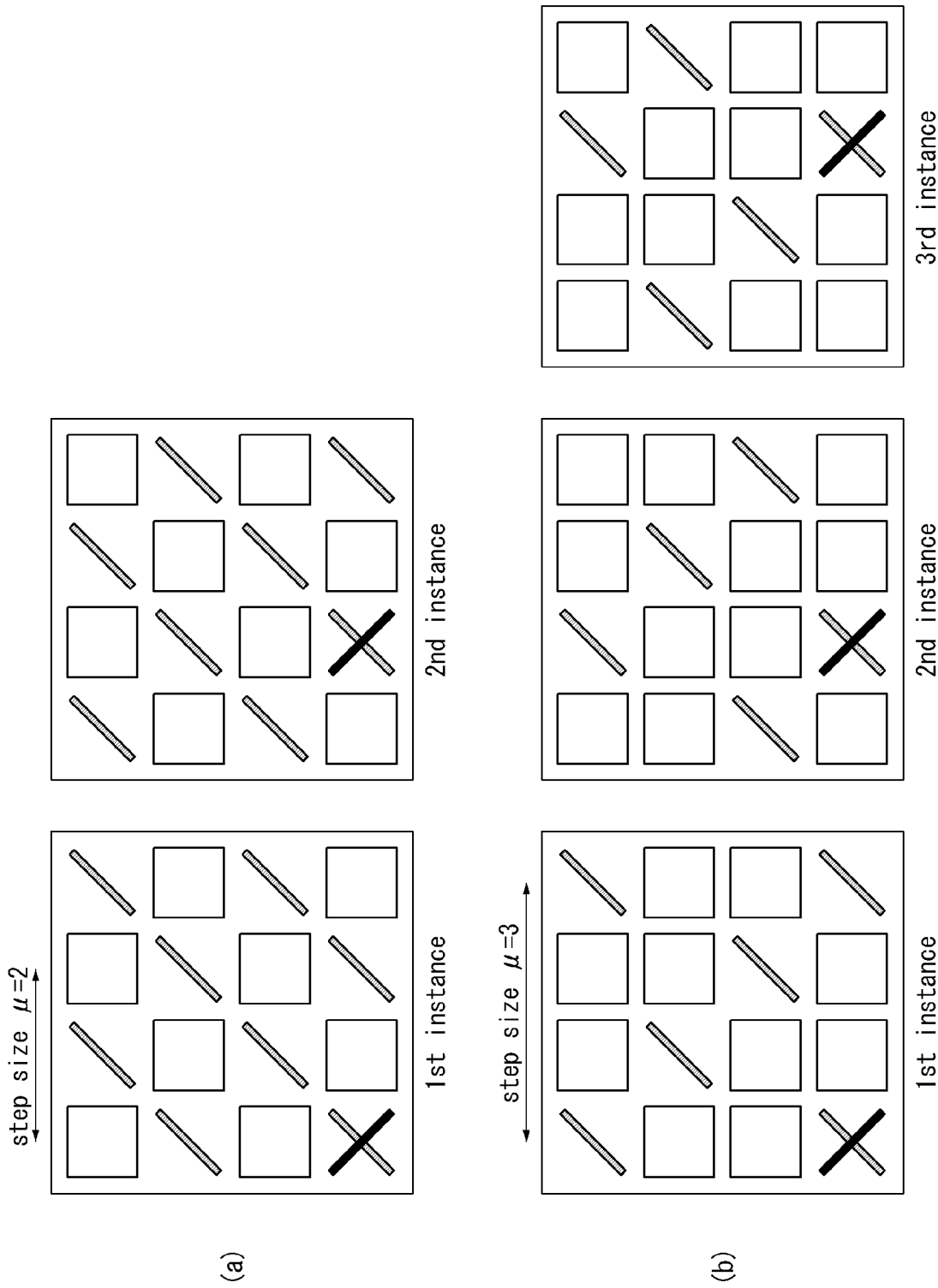

[FIG. 17]
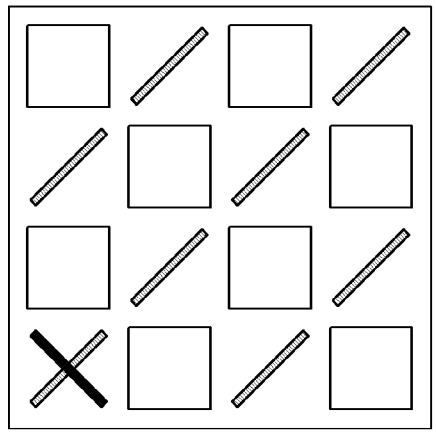
1st instance
(a)
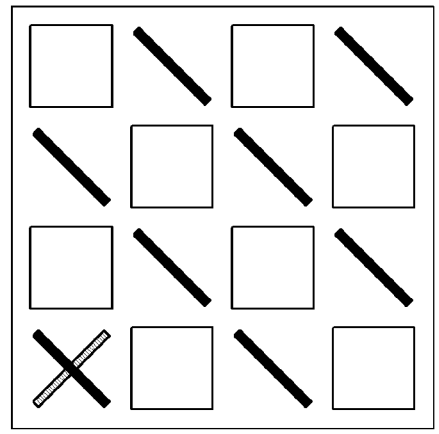
2nd instance
(b)
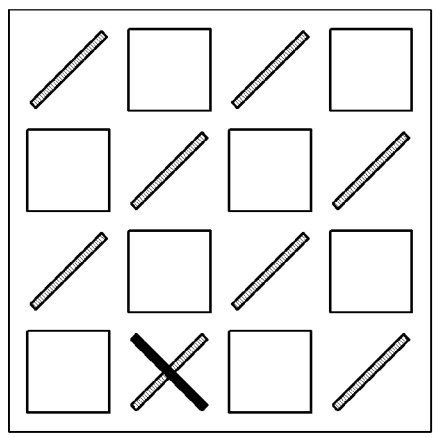
3rd instance
(c)
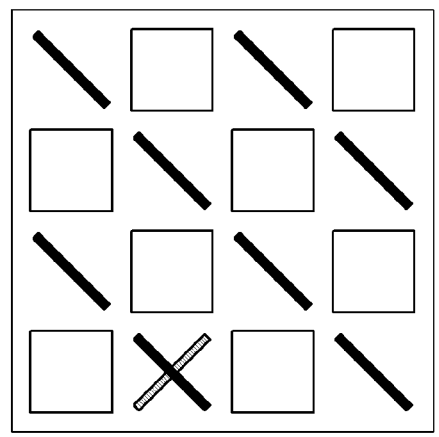
4th instance
(d)

[FIG. 18]
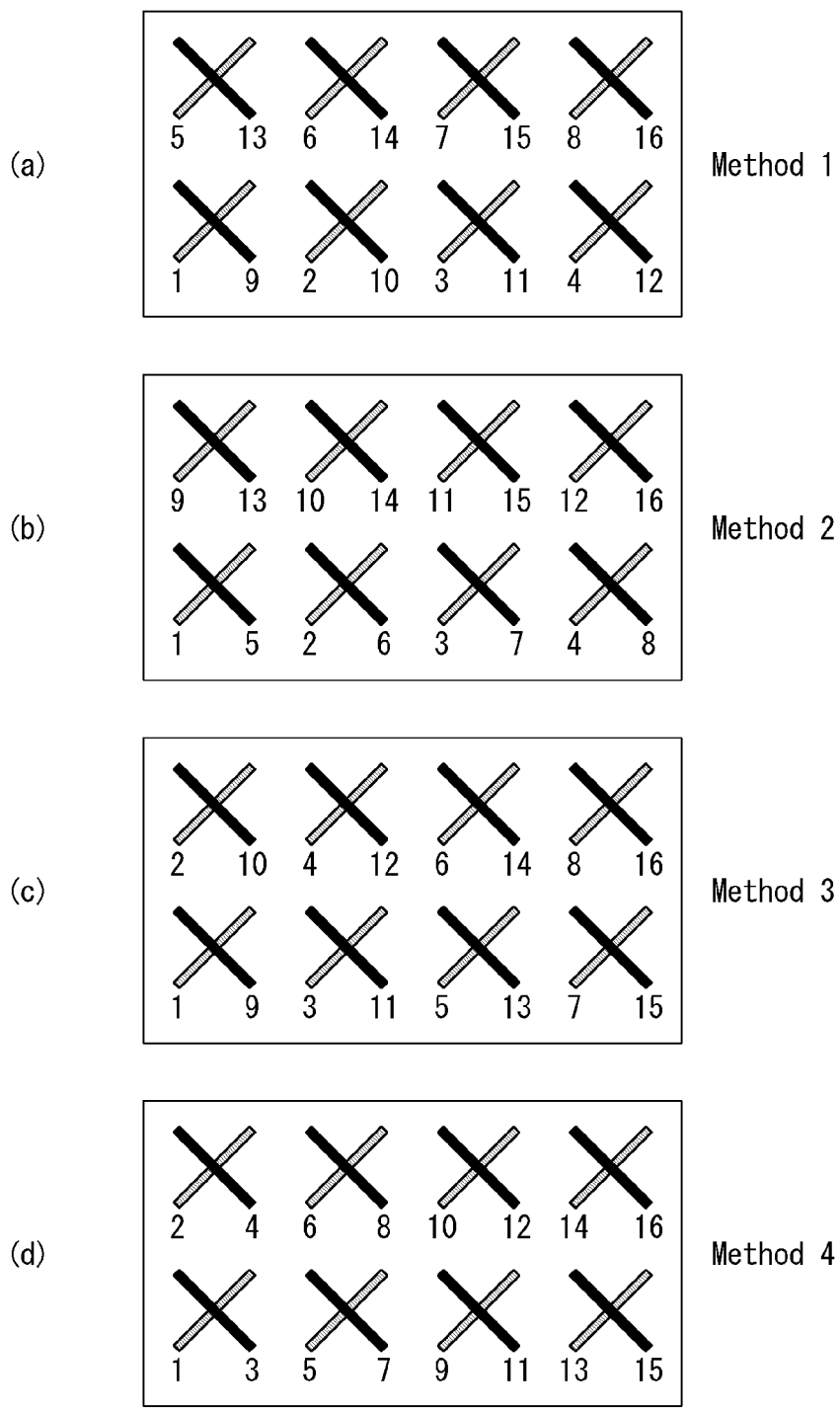

[FIG. 19]
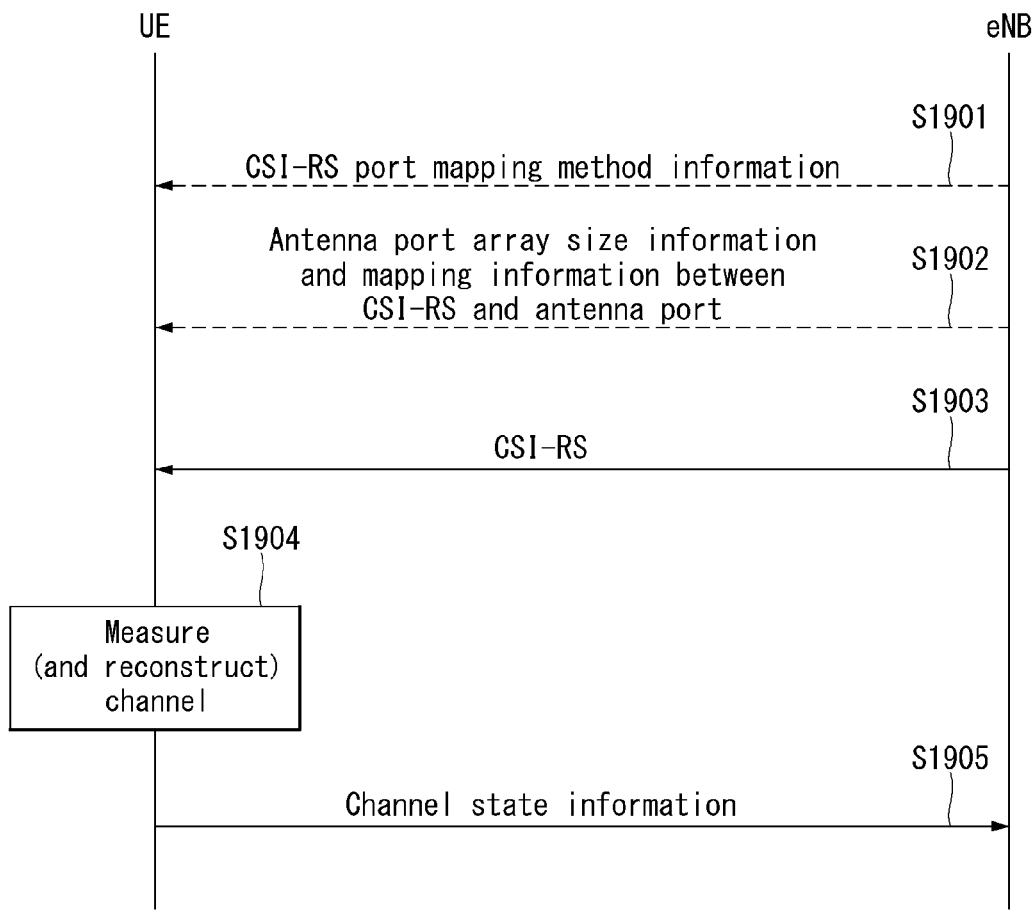
[FIG. 20]
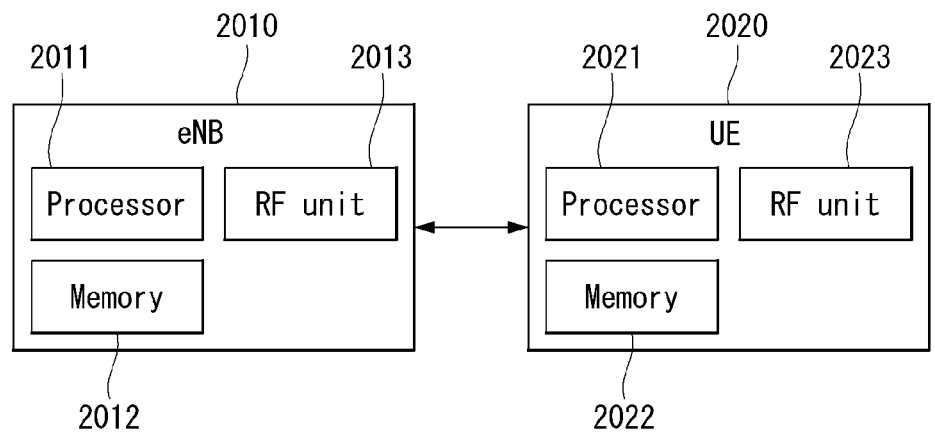

CHANNEL MEASUREMENT METHOD IN WIRELESS COMMUNICATION SYSTEM AND APPARATUS THEREFOR

This application is a 35 USC § 371 National Stage entry of International Application No. PCT/KR2016/005952, filed on Jun. 3, 2016, and claims priority to U.S. Provisional Application No. 62/172,213, filed Jun. 7, 2015, all of which are incorporated by reference in their entirety herein.

TECHNICAL FIELD

The present invention relates to a wireless communication system and, more particularly, to a method of measuring a channel based on a reference signal in a wireless communication system supporting a three-dimensional (3D) multi-input multi-output (MIMO) system and an apparatus supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to propose a method for a transmission end to transmit a reference signal in a wireless communication system supporting a 3D MIMO system.

Furthermore, an object of the present invention is to propose a method for a reception end to measure or reconstruct all of MIMO channels based on a reference signal in a wireless communication system supporting a 3D MIMO system.

Technological objects to be achieved by the present invention are not limited to the aforementioned objects, and other objects that have not been described may be clearly understood by a person having ordinary skill in the art to which the present invention pertains from the following description.

Technical Solution

In one aspect of the present invention, a method for a user equipment (UE) to measure a channel in a wireless communication system may include the steps of receiving a reference signal on part of antenna ports within a two-dimensional (2D) antenna port array from an eNB, measuring a channel for the part of antenna ports based on the reference signal received from the eNB, and reconstructing channels for all of antenna ports within the 2D antenna port array by reconstructing a channel for an antenna port not used for the transmission of the reference signal within the 2D antenna port array using the channel measurement result.

In another aspect of the present invention, a user equipment measuring a channel in a wireless communication system may include a radio frequency (RF) unit for transmitting and receiving a radio signal and a processor controlling the RF unit. The processor may be configured to receive a reference signal on part of antenna ports within a two-dimensional (2D) antenna port array from an eNB, measure a channel for the part of antenna ports based on the reference signal received from the eNB, and reconstruct channels for all of antenna ports within the 2D antenna port array by reconstructing a channel for an antenna port not used for the transmission of the reference signal within the 2D antenna port array using the channel measurement result.

Preferably, an antenna port located in the row or column of a boundary within the 2D antenna port array may be used for the transmission of the reference signal.

Preferably, the channel for the antenna port not used for the transmission of the reference signal may be reconstructed by interpolating or extrapolating the channel measurement result.

Preferably, if the 2D antenna port array may be a cross-polarization antenna system, a first polarization antenna port located in the row and column of a boundary within the 2D antenna port array may be used for the transmission of the reference signal.

Preferably, a second polarization antenna port located at one or more vertexes within or in the column of a specific boundary or the row of a specific boundary the 2D antenna port array may be used for the transmission of the reference signal.

Preferably, the channel for the first polarization antenna port not used for the transmission of the reference signal may be reconstructed using a channel measurement result for the first polarization antenna port used for the transmission of the reference signal. Channels for all of the second polarization antenna ports may be reconstructed using the reconstructed channels for all of the first polarization antenna ports and a channel for the second polarization antenna port.

Preferably, an antenna port distant at a specific interval in an identical row or column within the 2D antenna port array may be used for the transmission of the reference signal.

Preferably, an antenna port at a different location within the 2D antenna port array for each instance may be used for the transmission of the reference signal.

Preferably, the location of the antenna port used for the transmission of the reference signal within the 2D antenna port array may be shifted at a specific interval in the row or column whenever the instance is changed.

Preferably, channels for all of antenna ports within the 2D antenna port array may be reconstructed by reconstructing the channel for the antenna port not used for the transmission of the reference signal by interpolating or extrapolating the channel measurement result for each instance.

Preferably, an instant channel covariance matrix may be computed using the reconstructed channels for all of antenna ports for each instance, and a sample channel covariance matrix may be corrected by updating the instant channel covariance matrix.

Preferably, if the 2D antenna port array is a cross-polarization antenna system, a first polarization antenna port distant at a specific interval in the same row or column within the 2D antenna port array may be used for the transmission of the reference signal.

Preferably, a second polarization antenna port located at one or more vertexes or in the column of a specific boundary or the row of a specific boundary within the 2D antenna port array may be used for the transmission of the reference signal.

Preferably, a channel for a first polarization antenna port not used for the transmission of the reference signal may be reconstructed using a channel measurement result for a first polarization antenna port used for the transmission of the reference signal. Channels for all of the second polarization antenna ports may be reconstructed using the reconstructed channels for all of the first polarization antenna ports and the channel for the second polarization antenna port.

Preferably, the size of the 2D antenna port array and the location and index of the part of antenna ports used to transmit the reference signal within the 2D antenna port array may be received from the eNB.

Preferably, the size of the 2D antenna port array and the interval size of the antenna port used for the transmission of the reference signal in the same row or column within the 2D antenna port array may be received from the eNB.

Preferably, antenna port indices may be sequentially assigned to antenna ports determined based on the interval size and used for the transmission of the reference signal in a vertical direction or horizontal direction.

Advantageous Effects

In accordance with an embodiment of the present invention, in a wireless communication system, in an environment supporting a 3D MIMO system in which a two-dimensional (2D) active antenna system (2D-AAS) is used, channel reconstruction performance can be improved.

Effects which may be obtained by the present invention are not limited to the aforementioned effects, and other effects that have not been described may be clearly understood by a person having ordinary skill in the art to which the present invention pertains from the following description.

DESCRIPTION OF DRAWINGS

The accompanying drawings, which are included herein as a part of the description for help understanding the present invention, provide embodiments of the present invention, and describe the technical features of the present invention with the description below.

FIG. 1 illustrates the structure of a radio frame in a wireless communication system to which the present invention may be applied.

FIG. 2 is a diagram illustrating a resource grid for a downlink slot in a wireless communication system to which the present invention may be applied.

FIG. 3 illustrates a structure of downlink subframe in a wireless communication system to which the present invention may be applied.

FIG. 4 illustrates a structure of uplink subframe in a wireless communication system to which the present invention may be applied.

FIG. 5 shows the configuration of a known MIMO communication system.

FIG. 6 is a diagram showing a channel from a plurality of transmission antennas to a single reception antenna.

FIG. 7 illustrates reference signal patterns mapped to downlink resource block pairs in a wireless communication system to which the present invention may be applied.

FIG. 8 is a diagram illustrating resources to which reference signals are mapped in a wireless communication system to which the present invention may be applied.

FIG. 9 illustrates a 2D-AAS having 64 antenna elements in a wireless communication system to which the present invention may be applied.

FIG. 10 illustrates a system in which an eNB or UE has a plurality of transmission/reception antennas capable of forming a 3D beam based on the AAS in a wireless communication system to which the present invention may be applied.

FIG. 11 illustrates a 2D antenna system having cross-polarizations in a wireless communication system to which the present invention may be applied.

FIG. 12 illustrates a transceiver unit model in a wireless communication system to which the present invention may be applied.

FIG. 13 is a diagram illustrating full-port mapping according to an embodiment of the present invention.

FIG. 14 is a diagram illustrating a partial-port mapping method according to an embodiment of the present invention.

FIG. 15 is a diagram illustrating a partial-port mapping method according to an embodiment of the present invention.

FIG. 16 is a diagram illustrating a partial-port mapping method according to an embodiment of the present invention.

FIG. 17 is a diagram illustrating a partial-port mapping method according to an embodiment of the present invention.

FIG. 18 illustrates the allocation of antenna port indices in full-port mapping according to an embodiment of the present invention.

FIG. 19 is a diagram illustrating a channel measurement method according to an embodiment of the present invention.

FIG. 20 illustrates a block configuration of a wireless communication apparatus according to an embodiment of the present invention.

MODE FOR INVENTION

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot $2i$ and slot $2i+1$. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of T_slot=15360*T_s=0.5 ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs $N^{DL}$ included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144· $T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

FIG. 2 is a diagram illustrating a resource grid for one downlink slot in a wireless communication system to which an embodiment of the present invention may be applied.

(DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \qquad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s=[s_1, s_2, \ldots, s_{N_T}]^T \quad \text{[Equation 2]}$$

Meanwhile, transmission power may be different in each of pieces of transmission information $s\_1, s\_2, \ldots, s\_NT$. In this case, if pieces of transmission power are $P\_1, P\_2, \ldots, P\_NT$, transmission information having controlled transmission power may be represented using the following vector.

$$\hat{s}=[\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_1 \\ \vdots \\ s_{N_T} \end{bmatrix} = Ps \quad \text{[Equation 4]}$$

Meanwhile, the information vector having controlled transmission power in the Equation 4 is multiplied by a weight matrix W, thus forming N_T transmission signals $x\_1, x\_2, \ldots, x\_NT$ that are actually transmitted. In this case, the weight matrix functions to properly distribute the transmission information to antennas according to a transport channel condition. The following may be represented using the transmission signals $x\_1, x\_2, \ldots, x\_NT$.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In this case, $w\_ij$ denotes weight between an i-th transmission antenna and a j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals $y\_1, y\_2, \ldots, y\_NR$ of the respective antennas are represented as follows using a vector y.

$$y=[y_1, y_2, \ldots, y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as $h\_ij$. In this case, it is to be noted that in order of the index of $h\_ij$, the index of a reception antenna comes first and the index of a transmission antenna then comes.

Several channels may be grouped and expressed in a vector and matrix form. For example, a vector expression is described below.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \ldots, h_{iN_T}] \quad \text{[Equation 7]}$$

Furthermore, if all channels from the N_T transmission antenna to NR reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \quad \text{[Equation 8]}$$

Meanwhile, Additive White Gaussian Noise (AWGN) is added to an actual channel after the actual channel experiences the channel matrix H. Accordingly, AWGN $n\_1, n\_2, \ldots, n\_NR$ added to the N_R reception antennas, respectively, are represented using a vector as follows.

$$n=[n_1, n_2, \ldots, n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$[\text{Equation 10}]$$

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & \ddots & \vdots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \qquad [\text{Equation 11}]$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (Cal), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

FIG. 7 illustrates reference signal patterns mapped to downlink resource block pairs in a wireless communication system to which the present invention may be applied.

Referring to FIG. 7, a downlink resource block pair, that is, a unit in which a reference signal is mapped, may be represented in the form of one subframe in a time domain X 12 subcarriers in a frequency domain. That is, in a time axis (an x axis), one resource block pair has a length of 14 OFDM symbols in the case of a normal cyclic prefix (CP) (FIG. 7a) and has a length of 12 OFDM symbols in the case of an extended cyclic prefix (CP) (FIG. 7b). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

A CRS is described in more detail below. The CRS is a reference signal which is used to estimate the channel of a physical antenna and may be received by all UEs located within a cell in common. The CRS is distributed to a full frequency bandwidth. That is, the CRS is cell-specific signal and is transmitted every subframe in a wideband. Furthermore, the CRS may be used for channel quality information (CSI) and data demodulation.

A CRS is defined in various formats depending on an antenna array on the transmitting side (eNB). In the 3GPP LTE system (e.g., Release-8), an RS for a maximum four antenna ports is transmitted depending on the number of transmission antennas of an eNB. The side from which a downlink signal is transmitted has three types of antenna arrays, such as a single transmission antenna, two transmission antennas and four transmission antennas. For example, if the number of transmission antennas of an eNB is two, CRSs for a No. 0 antenna port and a No. 1 antenna port are transmitted. If the number of transmission antennas of an eNB is four, CRSs for No. 0~No. 3 antenna ports are transmitted. If the number of transmission antennas of an eNB is four, a CRS pattern in one RB is shown in FIG. 7.

If an eNB uses a single transmission antenna, reference signals for a single antenna port are arrayed.

If an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, if an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user-multi-input/output (MIMO) antenna.

If a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

A DRS is described in more detail below. The DRS is used to demodulate data. In multi-input multi-output antenna transmission, precoding weight used for a specific UE is combined with a transmission channel transmitted by each transmission antenna when the UE receives an RS, and is used to estimate a corresponding channel without any change.

A 3GPP LTE system (e.g., Release-8) supports a maximum of four transmission antennas, and a DRS for rank 1 beamforming is defined. The DRS for rank 1 beamforming also indicates an RS for an antenna port index 5.

In an LTE-A system, that is, an advanced and developed form of the LTE system, the design is necessary to support a maximum of eight transmission antennas in the downlink of an eNB. Accordingly, RSs for the maximum of eight transmission antennas must be also supported. In the LTE system, only downlink RSs for a maximum of four antenna ports has been defined. Accordingly, if an eNB has four to a maximum of eight downlink transmission antennas in the LTE-A system, RSs for these antenna ports must be additionally defined and designed. Regarding the RSs for the maximum of eight transmission antenna ports, the aforementioned RS for channel measurement and the aforementioned RS for data demodulation must be designed.

One of important factors that must be considered in designing an LTE-A system is backward compatibility, that is, that an LTE UE must well operate even in the LTE-A system, which must be supported by the system. From an RS transmission viewpoint, in the time-frequency domain in which a CRS defined in LTE is transmitted in a full band every subframe, RSs for a maximum of eight transmission antenna ports must be additionally defined. In the LTE-A system, if an RS pattern for a maximum of eight transmission antennas is added in a full band every subframe using the same method as the CRS of the existing LTE, RS overhead is excessively increased.

Accordingly, the RS newly designed in the LTE-A system is basically divided into two types, which include an RS having a channel measurement object for the selection of MCS or a PMI (channel state information-RS or channel state indication-RS (CSI-RS)) and an RS for the demodulation of data transmitted through eight transmission antennas (data demodulation-RS (DM-RS)).

The CSI-RS for the channel measurement object is characterized in that it is designed for an object focused on channel measurement unlike the existing CRS used for objects for measurement, such as channel measurement and handover, and for data demodulation. Furthermore, the CSI-RS may also be used for an object for measurement, such as handover. The CSI-RS does not need to be transmitted every subframe unlike the CRS because it is transmitted for an object of obtaining information about a channel state. In order to reduce overhead of a CSI-RS, the CSI-RS is intermittently transmitted on the time axis.

For data demodulation, a DM-RS is dedicatedly transmitted to a UE scheduled in a corresponding time-frequency domain. That is, a DM-RS for a specific UE is transmitted only in a region in which the corresponding UE has been scheduled, that is, in the time-frequency domain in which data is received.

In the LTE-A system, a maximum of eight transmission antennas are supported in the downlink of an eNB. In the LTE-A system, if RSs for a maximum of eight transmission antennas are transmitted in a full band every subframe using the same method as the CRS in the existing LTE, RS overhead is excessively increased. Accordingly, in the LTE-A system, an RS has been separated into the CSI-RS of the CSI measurement object for the selection of MCS or a PMI and the DM-RS for data demodulation, and thus the two RSs have been added. The CSI-RS may also be used for an object, such as RRM measurement, but has been designed for a main object for the acquisition of CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS has a period corresponding to a multiple of the integer of one subframe and may be periodically transmitted or transmitted in a specific transmission pattern. In this case, the period or pattern in which the CSI-RS is transmitted may be set by an eNB.

For data demodulation, a DM-RS is dedicatedly transmitted to a UE scheduled in a corresponding time-frequency domain. That is, a DM-RS for a specific UE is transmitted only in the region in which scheduling is performed for the corresponding UE, that is, only in the time-frequency domain in which data is received.

In order to measure a CSI-RS, a UE must be aware of information about the transmission subframe index of the CSI-RS for each CSI-RS antenna port of a cell to which the UE belongs, the location of a CSI-RS resource element (RE) time-frequency within a transmission subframe, and a CSI-RS sequence.

In the LTE-A system, an eNB has to transmit a CSI-RS for each of a maximum of eight antenna ports. Resources used for the CSI-RS transmission of different antenna ports must be orthogonal. When one eNB transmits CSI-RSs for different antenna ports, it may orthogonally allocate the resources according to the FDM/TDM scheme by mapping the CSI-RSs for the respective antenna ports to different REs. Alternatively, the CSI-RSs for different antenna ports may be transmitted according to the CDM scheme for mapping the CSI-RSs to pieces of code orthogonal to each other.

When an eNB notifies a UE belonging to the eNB of information on a CSI-RS, first, the eNB must notify the UE of information about a time-frequency in which a CSI-RS for each antenna port is mapped. Specifically, the information includes subframe numbers in which the CSI-RS is transmitted or a period in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

A CSI-RS is transmitted through one, two, four or eight antenna ports. Antenna ports used in this case are p=15, p=15, 16, p=15, . . . , 18, and p=15, . . . , 22, respectively. A CSI-RS may be defined for only a subcarrier interval Δf=15 kHz.

In a subframe configured for CSI-RS transmission, a CSI-RS sequence is mapped to a complex-valued modulation symbol a_k,l^(p) used as a reference symbol on each antenna port p as in Equation 12.

[Equation 12]

$$a_{k,l}^{(p)} = w_{l''} \cdot r_{l,n_s}(m')$$

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & CSI \text{ reference signal configurations 0-19, normal cyclic prefix} \\ 2l'' & CSI \text{ reference signal configurations 20-31, normal cyclic prefix} \\ l'' & CSI \text{ reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 12, (k',l') (wherein k' is a subcarrier index within a resource block and l' indicates an OFDM symbol index within a slot.) and the condition of n_s is determined depending on a CSI-RS configuration, such as Table 3 or Table 4.

Table 3 illustrates the mapping of (k',l') from a CSI-RS configuration in a normal CP.

TABLE 3

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |

TABLE 3-continued

| CSI reference signal configuration | Number of CSI reference signals configured | | | | | |
|---|---|---|---|---|---|---|
| | 1 or 2 | | 4 | | 8 | |
| | (k', l') | n_s mod 2 | (k', l') | n_s mod 2 | (k', l') | n_s mod 2 |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

Table 4 illustrates the mapping of (k',l') from a CSI-RS configuration in an extended CP.

TABLE 4

| | CSI reference signal configuration | Number of CSI reference signals configured | | | | | |
|---|---|---|---|---|---|---|---|
| | | 1 or 2 | | 4 | | 8 | |
| | | (k', l') | n_s mod 2 | (k', l') | n_s mod 2 | (k', l') | n_s mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Referring to Table 3 and Table 4, in the transmission of a CSI-RS, in order to reduce inter-cell interference (ICI) in a multi-cell environment including a heterogeneous network (HetNet) environment, a maximum of 32 different configurations (in the case of a normal CP) or a maximum of 28 different configurations (in the case of an extended CP) are defined.

The CSI-RS configuration is different depending on the number of antenna ports and a CP within a cell, and a neighboring cell may have a maximum of different configurations. Furthermore, the CSI-RS configuration may be divided into a case where it is applied to both an FDD frame and a TDD frame and a case where it is applied to only a TDD frame depending on a frame structure.

(k',l') and n_s are determined depending on a CSI-RS configuration based on Table 3 and Table 4, and time-frequency resources used for CSI-RS transmission are determined depending on each CSI-RS antenna port.

FIG. 8 is a diagram illustrating resources to which reference signals are mapped in a wireless communication system to which the present invention may be applied.

FIG. 8(a) shows twenty types of CSI-RS configurations available for CSI-RS transmission by one or two CSI-RS antenna ports, FIG. 8(b) shows ten types of CSI-RS configurations available for four CSI-RS antenna ports, and FIG. 8(c) shows five types of CSI-RS configurations available for eight CSI-RS antenna ports.

As described above, radio resources (i.e., an RE pair) in which a CSI-RS is transmitted are determined depending on each CSI-RS configuration.

If one or two antenna ports are configured for CSI-RS transmission with respect to a specific cell, the CSI-RS is transmitted on radio resources on a configured CSI-RS configuration of the twenty types of CSI-RS configurations shown in FIG. 8(a).

Likewise, when four antenna ports are configured for CSI-RS transmission with respect to a specific cell, a CSI-RS is transmitted on radio resources on a configured CSI-RS configuration of the ten types of CSI-RS configurations shown in FIG. 8(b). Furthermore, when eight antenna ports are configured for CSI-RS transmission with respect to a specific cell, a CSI-RS is transmitted on radio resources on a configured CSI-RS configuration of the five types of CSI-RS configurations shown in FIG. 8(c).

A CSI-RS for each antenna port is subjected to CDM for every two antenna ports (i.e., {15,16}, {17,18}, {19,20} and {21,22}) on the same radio resources and transmitted. For example, in the case of antenna ports 15 and 16, CSI-RS complex symbols for the respective antenna ports 15 and 16 are the same, but are multiplied by different types of orthogonal code (e.g., Walsh code) and mapped to the same radio resources. The complex symbol of the CSI-RS for the antenna port 15 is multiplied by [1, 1], and the complex symbol of the CSI-RS for the antenna port 16 is multiplied by [1 −1] and mapped to the same radio resources. The same is true of the antenna ports {17,18}, {19,20} and {21,22}.

A UE may detect a CSI-RS for a specific antenna port by multiplying code by which a transmitted symbol has been multiplied. That is, a transmitted symbol is multiplied by the code [1 1] multiplied in order to detect the CSI-RS for the antenna port 15, and a transmitted symbol is multiplied by the code [1 −1] multiplied in order to detect the CSI-RS for the antenna port 16.

Referring to FIGS. 8(a) to 8(c), in the case of the same CSI-RS configuration index, radio resources according to a CSI-RS configuration having a large number of antenna ports include radio resources having a small number of CSI-RS antenna ports. For example, in the case of a CSI-RS configuration 0, radio resources for the number of eight antenna ports include both radio resources for the number of four antenna ports and radio resources for the number of one or two antenna ports.

A plurality of CSI-RS configurations may be used in one cell. 0 or one CSI-RS configuration may be used for a non-zero power (NZP) CSI-RS, and 0 or several CSI-RS configurations may be used for a zero power (ZP) CSI-RS.

For each bit set to 1 in a zeropower (ZP) CSI-RS ('ZeroPowerCSI-RS') that is a bitmap of 16 bits configured by a high layer, a UE assumes zero transmission power in REs (except a case where an RE overlaps an RE assuming a NZP CSI-RS configured by a high layer) corresponding to the four CSI-RS columns of Table 3 and Table 4. The most significant bit (MSB) corresponds to the lowest CSI-RS configuration index, and next bits in the bitmap sequentially correspond to next CSI-RS configuration indices.

A CSI-RS is transmitted only in a downlink slot that satisfies the condition of (n_s mod 2) in Table 3 and Table 4 and a subframe that satisfies the CSI-RS subframe configurations.

In the case of the frame structure type 2 (TDD), a CSI-RS is not transmitted in a special subframe, a synchronization signal (SS), a subframe colliding against a PBCH or SystemInformationBlockType1 (SIB 1) Message transmission or a subframe configured to paging message transmission.

Furthermore, an RE in which a CSI-RS for any antenna port belonging to an antenna port set S (S={15}, S={15,16}, S={17,18}, S={19,20} or S={21,22}) is transmitted is not used for the transmission of a PDSCH or for the CSI-RS transmission of another antenna port.

Time-frequency resources used for CSI-RS transmission cannot be used for data transmission. Accordingly, data throughput is reduced as CSI-RS overhead is increased. By considering this, a CSI-RS is not configured to be transmitted every subframe, but is configured to be transmitted in each transmission period corresponding to a plurality of subframes. In this case, CSI-RS transmission overhead can be significantly reduced compared to a case where a CSI-RS is transmitted every subframe.

A subframe period (hereinafter referred to as a "CSI transmission period") T_CSI-RS and a subframe offset Δ_CSI-RS for CSI-RS transmission are shown in Table 5.

Table 5 illustrates CSI-RS subframe configurations.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Referring to Table 5, the CSI-RS transmission period T_CSI-RS and the subframe offset Δ_CSI-RS are determined depending on the CSI-RS subframe configuration I_CSI-RS.

The CSI-RS subframe configuration of Table 5 may be configured as one of the aforementioned 'SubframeConfig' field and 'zeroTxPowerSubframeConfig' field. The CSI-RS subframe configuration may be separately configured with respect to an NZP CSI-RS and a ZP CSI-RS.

A subframe including a CSI-RS satisfies Equation 13.

$$(10 n_f + \lfloor n_s/2 \rfloor - \Delta_{CSI-RS}) \bmod T_{CSI-RS} = 0 \quad \text{[Equation 13]}$$

In Equation 13, T_CSI-RS means a CSI-RS transmission period, Δ_CSI-RS means a subframe offset value, n_f means a system frame number, and n_s means a slot number.

In the case of a UE in which the transmission mode 9 has been configured with respect to a serving cell, one CSI-RS resource configuration may be configured for the UE. In the case of a UE in which the transmission mode 10 has been configured with respect to a serving cell, one or more CSI-RS resource configuration (s) may be configured for the UE.

In the current LTE standard, a CSI-RS configuration includes an antenna port number (antennaPortsCount), a subframe configuration (subframeConfig), and a resource configuration (resourceConfig). Accordingly, the a CSI-RS configuration provides notification that a CSI-RS is transmitted how many antenna port, provides notification of the period and offset of a subframe in which a CSI-RS will be transmitted, and provides notification that a CSI-RS is transmitted in which RE location (i.e., a frequency and OFDM symbol index) in a corresponding subframe.

Specifically, the following parameters for each CSI-RS (resource) configuration are configured through high layer signaling.

If the transmission mode 10 has been configured, a CSI-RS resource configuration identifier A CSI-RS port number (antennaPortsCount): a parameter (e.g., one CSI-RS port, two CSI-RS ports, four CSI-RS ports or eight CSI-RS ports) indicative of the number of antenna ports used for CSI-RS transmission A CSI-RS configuration (resourceConfig) (refer to Table 3 and Table 4): a parameter regarding a CSI-RS allocation resource location A CSI-RS subframe configuration (subframeConfig, that is, I_CSI-RS) (refer to Table 5): a parameter regarding the period and/or offset of a subframe in which a CSI-RS will be transmitted If the transmission mode 9 has been configured, transmission power P_C for CSI feedback: in relation to the assumption of a UE for reference PDSCH transmission power for feedback, when the UE derives CSI feedback and takes a value within a [−8, 15] dB range in a 1-dB step size, P_C is assumed to be the ratio of energy per resource element (EPRE) per PDSCH RE and a CSI-RS EPRE.

If the transmission mode 10 has been configured, transmission power P_C for CSI feedback with respect to each CSI process. If CSI subframe sets C_CSI,0 and C_CSI,1 are configured by a high layer with respect to a CSI process, P_C is configured for each CSI subframe set in the CSI process.

A pseudo-random sequence generator parameter n_ID

If the transmission mode 10 has been configured, a high layer parameter 'qcl-CRS-Info-r11' including a QCL scrambling identifier for a quasico-located (QCL) type B UE assumption (qcl-ScramblingIdentity-r11), a CRS port count (crs-PortsCount-r11), and an MBSFN subframe configuration list (mbsfn-SubframeConfigList-r11) parameter.

When a CSI feedback value derived by a UE has a value within the [−8, 15] dB range, P_C is assumed to be the ration of PDSCH EPRE to CSI-RS EPRE. In this case, the PDSCH EPRE corresponds to a symbol in which the ratio of PDSCH EPRE to CRS EPRE is $\rho\_A$.

A CSI-RS and a PMCH are not configured in the same subframe of a serving cell at the same time.

In the frame structure type 2, if four CRS antenna ports have been configured, a CSI-RS configuration index belonging to the [20-31] set (refer to Table 3) in the case of a normal CP or a CSI-RS configuration index belonging to the [16-27] set (refer to Table 4) in the case of an extended CP is not configured in a UE.

A UE may assume that the CSI-RS antenna port of a CSI-RS resource configuration has a QCL relation with delay spread, Doppler spread, Doppler shift, an average gain and average delay.

A UE in which the transmission mode 10 and the QCL type B have been configured may assume that antenna ports 0-3 corresponding to a CSI-RS resource configuration and antenna ports 15-22 corresponding to a CSI-RS resource configuration have QCL relation with Doppler spread and Doppler shift.

In the case of a UE in which the transmission modes 1-9 have been configured, one ZP CSI-RS resource configuration may be configured in the UE with respect to a serving cell. In the case of a UE in which the transmission mode 10 has been configured, one or more ZP CSI-RS resource configurations may be configured in the UE with respect to a serving cell.

The following parameters for a ZP CSI-RS resource configuration may be configured through high layer signaling.

The ZP CSI-RS configuration list (zeroTxPowerResourceConfigList) (refer to Table 3 and Table 4): a parameter regarding a zero-power CSI-RS configuration The ZP CSI-RS subframe configuration (zeroTxPowerSubframeConfig, that is, I_CSI-RS) (refer to Table 5): a parameter regarding the period and/or offset of a subframe in which a zero-power CSI-RS is transmitted A ZP CSI-RS and a PMCH are not configured in the same subframe of a serving cell at the same time.

In the case of a UE in which the transmission mode 10 has been configured, one or more channel state information-interference measurement (CSI-IM) resource configurations may be configured in the UE with respect to a serving cell.

The following parameters for each CSI-IM resource configuration may be configured through high layer signaling.

The ZP CSI-RS configuration (refer to Table 3 and Table 4)

The ZP CSI RS subframe configuration I_CSI-RS (refer to Table 5)

A CSI-IM resource configuration is the same as any one of configured ZP CSI-RS resource configurations.

A CSI-IM resource and a PMCH are not configured within the same subframe of a serving cell at the same time.

Massive MIMO

A MIMO system having a plurality of antennas may be called a massive MIMO system and has been in the spotlight as means for improving spectrum efficiency, energy efficiency and processing complexity.

In recent 3GPP, in order to satisfy the requirements of spectrum efficiency for a future mobile communication system, a discussion about the massive MIMO system has started. The massive MIMO is also called full-dimension MIMO (FD-MIMO).

In a wireless communication system after LTE Release (Rel)-12, the introduction of an active antenna system (AAS) is considered.

Unlike the existing passive antenna system in which an amplifier and antenna capable of adjusting the phase and size of a signal have been separated, the AAS means a system in which each antenna is configured to include an active element, such as an amplifier.

The AAS does not require a separate cable, connector and other hardware for connecting an amplifier and an antenna because the active antenna is used, and thus has a high efficiency characteristic in terms of energy and operating costs. In particular, the AAS enables an advanced MIMO technology, such as the formation of an accurate beam pattern or 3D beam pattern in which a beam direction and a beam width are considered because the AAS supports each electronic beam control method.

Due to the introduction of an advanced antenna system, such as the AAS, a massive MIMO structure having a plurality of input/output antennas and a multi-dimension antenna structure is also considered. For example, unlike in the existing straight type antenna array, if a two-dimensional (2D) antenna array is formed, a 3D beam pattern can be formed by the active antenna of the AAS.

FIG. 9 illustrates a 2D-AAS having 64 antenna elements in a wireless communication system to which the present invention may be applied.

FIG. 9 illustrates a common 2D antenna array. A case where N_t=N_v·N_h antennas has a square form as in FIG. 9 may be considered. In this case, N_h indicates the number of antenna columns in a horizontal direction, and N_v indicates the number of antenna rows in a vertical direction.

If the antenna array of such a 2D structure is used, radio waves can be controlled both in the vertical direction (elevation) and the horizontal direction (azimuth) so that a transmission beam can be controlled in the 3D space. A wavelength control mechanism of such a type may be called 3D beamforming.

FIG. 10 illustrates a system in which an eNB or UE has a plurality of transmission/reception antennas capable of forming a 3D beam based on the AAS in a wireless communication system to which the present invention may be applied.

FIG. 10 is a diagram of the aforementioned example and illustrates a 3D MIMO system using a 2D antenna array (i.e., 2D-AAS).

From the point of view of a transmission antenna, if a 3D beam pattern is used, a semi-static or dynamic beam can be formed in the vertical direction of the beam in addition to the horizontal direction. For example, an application, such as the formation of a sector in the vertical direction, may be considered.

Furthermore, from the point of view of a reception antenna, when a reception beam is formed using a massive reception antenna, a signal power rise effect according to an antenna array gain may be expected. Accordingly, in the case of the uplink, an eNB can receive a signal from a UE through a plurality of antennas. In this case, there is an advantage in that the UE can set its transmission power very low by considering the gain of the massive reception antenna in order to reduce an interference influence.

FIG. 11 illustrates a 2D antenna system having cross-polarizations in a wireless communication system to which the present invention may be applied.

A 2D planar antenna array model in which polarization is considered may be diagrammed as shown in FIG. 11.

Unlike the existing MIMO system according to a passive antenna, a system based on an active antenna can dynamically control the gain of an antenna element by applying weight to an active element (e.g., an amplifier) to which each antenna element has been attached (or included). The antenna system may be modeled in an antenna element level because a radiation pattern depends on the number of antenna elements and an antenna arrangement, such as antenna spacing.

An antenna array model, such as the example of FIG. 11, may be represented by (M, N, P). This corresponds to a parameter that characterizes an antenna array structure.

M indicates the number of antenna elements having the same polarization in each column (i.e., the vertical direction) (i.e., the number of antenna elements having a +45° slant in each column or the number of antenna elements having a −45° slant in each column).

N indicates the number of columns in the horizontal direction (i.e., the number of antenna elements in the horizontal direction).

P indicates the number of dimensions of polarization. P=2 in the case of cross-polarization as in the case of FIG. 11, or P=1 in the case of co-polarization.

An antenna port may be mapped to a physical antenna element. The antenna port may be defined by a reference signal related to a corresponding antenna port. For example, in the LTE system, the antenna port 0 may be related to a cell-specific reference signal (CRS), and the antenna port 6 may be related to a positioning reference signal (PRS).

For example, an antenna port and a physical antenna element may be mapped in a one-to-one manner. This may correspond to a case where a single cross-polarization antenna element is used for downlink MIMO or downlink transmit diversity. For example, the antenna port 0 is mapped to one physical antenna element, whereas the antenna port 1 may be mapped to the other physical antenna element. In this case, from the point of view of a UE, two types of downlink transmission are present. One is related to a reference signal for the antenna port 0, and the other is related to a reference signal for the antenna port 1.

For another example, a single antenna port may be mapped to multiple physical antenna elements. This may correspond to a case where a single antenna port is used for beamforming. In beamforming, multiple physical antenna elements are used, so downlink transmission may be directed toward a specific UE. In general, this may be achieved using an antenna array configured using multiple columns of multiple cross-polarization antenna elements. In this case, from the point of view of a UE, one type of downlink transmission generated from a single antenna port is present. One is related to a CRS for the antenna port 0, and the other is related to a CRS for the antenna port 1.

That is, an antenna port indicates downlink transmission from the point of view of a UE not actual downlink transmission from a physical antenna element by an eNB.

For another example, a plurality of antenna ports is used for downlink transmission, but each antenna port may be mapped to multiple physical antenna elements. This may correspond to a case where an antenna array is used for downlink MIMO or downlink diversity. For example, each of the antenna ports 0 and 1 may be mapped to multiple physical antenna elements. In this case, from the point of view of a UE, two types of downlink transmission. One is related to a reference signal for the antenna port 0, and the other is related to a reference signal for the antenna port 1.

In FD-MIMO, the MIMO precoding of a data stream may experience antenna port virtualization, transceiver unit (or a transmission and reception unit) (TXRU) virtualization, and an antenna element pattern.

In the antenna port virtualization, a stream on an antenna port is precoded on a TXRU. In the TXRU virtualization, a TXRU signal is precoded on an antenna element. In the antenna element pattern, a signal radiated by an antenna element may have a directional gain pattern.

In the existing transceiver modeling, a static one-to-one mapping between an antenna port and a TXRU is assumed, and a TXRU virtualization effect is joined into a static (TXRU) antenna pattern including the effects of the TXRU virtualization and the antenna element pattern.

The antenna port virtualization may be performed by a frequency-selective method. In LTE, an antenna port, together with a reference signal (or pilot), is defined. For example, for precoded data transmission on an antenna port, a DMRS is transmitted in the same bandwidth as a data signal, and both the DMRS and data are precoded by the same precoder (or the same TXRU virtualization precoding). For CSI measurement, a CSI-RS is transmitted through multiple antenna ports. In CSI-RS transmission, a precoder that characterizes mapping between a CSI-RS port and a TXRU may be designed in a unique matrix so that a UE can estimate a TXRU virtualization precoding matrix for a data precoding vector.

A TXRU virtualization method is discussed in 1D TXRU virtualization and 2D TXRU virtualization, which are described below with reference to the following drawing.

FIG. 12 illustrates a transceiver unit model in a wireless communication system to which the present invention may be applied.

In the 1D TXRU virtualization, M_TXRU TXRUs are related to M antenna elements configured in a single column antenna array having the same polarization.

In the 2D TXRU virtualization, a TXRU model configuration corresponding to the antenna array model configuration (M, N, P) of FIG. 11 may be represented by (M_TXRU, N, P). In this case, M_TXRU means the number of TXRUs present in the 2D same column and same polarization, and always satisfies M_TXRU≤M. That is, the total number of TXRUs is the same as M_TXRU×N×P.

A TXRU virtualization model may be divided into a TXRU virtualization model option-1: sub-array partition model as in FIG. 12(a) and a TXRU virtualization model option-2: full connection model as in FIG. 12(b) depending on a correlation between an antenna element and a TXRU.

Referring to FIG. 12(a), in the case of the sub-array partition model, an antenna element is partitioned into multiple antenna element groups, and each TXRU is connected to one of the groups.

Referring to FIG. 12(b), in the case of the full-connection model, the signals of multiple TXRUs are combined and transferred to a single antenna element (or the arrangement of antenna elements).

In FIG. 12, q is the transmission signal vectors of antenna elements having M co-polarizations within one column. W is a wideband TXRU virtualization vector, and W is a wideband TXRU virtualization matrix. X is the signal vectors of M_TXRU TXRUs.

In this case, mapping between an antenna port and TXRUs may be one-to-one or one-to-many.

In FIG. 12, mapping between a TXRU and an antenna element (TXRU-to-element mapping) shows one example, but the present invention is not limited thereto. From the point of view of hardware, the present invention may be identically applied to mapping between an TXRU and an antenna element which may be implemented in various forms.

CSI-RS Antenna Port Mapping Method for 2D-AAS

The present invention proposes a method using an antenna port (or this may correspond to an antenna element according to virtualization between a specific antenna port and a specific antenna element (port-to-element) or if one-to-one mapping between an antenna port and a TXRU is applied, the antenna port may correspond to the TXRU, hereinafter collectively referred to as an "antenna port" or "port", for convenience of description) when a transmission end (e.g., eNB) transmits a CSI-RS as a technology based on a 3D MIMO system in which a two-dimensional (2D) active antenna system (AAS) has been disposed (used).

If a 2D-AAS, such as the example of FIG. 9, is introduced, in order to notify a reception end of a channel from a transmission end (e.g., an eNB) to the reception end (e.g., a UE) (or in order to obtain channel state information from the reception end), the transmission end may transmit a CSI-RS to the reception end.

Hereinafter, a CSI-RS is basically described for convenience of description, but the present invention is not limited thereto. That is, the present invention described hereinafter may be identically applied to another reference signal different from the CSI-RS.

In the LTE/LTE-A Release (Rel)-12 systems, 1-port, 2-port, 4-port or 8-port CSI-RS resources have been designed for such a CSI-RS. Each n-port CSI-RS resource is transmitted (refer to FIG. 8) using non-zero (NZP)-CSI-RS resources.

In a 3D MIMO-based system, a CSI-RS (total) antenna port number (per CSI process) must be able to support cases where the Rel-12 is not supported. That is, for CSI-RS transmission, it is preferred that not only the number of antenna ports supported in the Rel-12, but the number of antenna ports not supported in the Rel-12 is supported so that they can be used. In this case, the number of antenna ports for CSI-RS transmission may correspond to all of the number of antenna ports in which a CSI-RS is defined or may correspond to the number of some antenna ports.

For example, the number of antenna ports per CSI process or per CSI-RS resource, which is not supported in the Rel-12, may include 6, 10, 12, 32, 64, etc., for example.

The present invention proposes a full-port mapping method and a partial-port mapping method, that is, methods of mapping the CSI-RS ports to a resource element (RE) and/or a TXRU.

1) Full-port mapping: a reception end may measure all of MIMO channels using the full-port mapping method.

For example, one-to-one mapping between an antenna port and a TXRU (port-to-TXRU) may be applied to the full-port mapping method. That is, all of MIMO channels from all of TXRUs may be measured by the reception end.

2) Partial-port mapping: this means a method of measuring a channel using only some CSI-RS ports in order to reduce CSI-RS overhead of the full-port mapping method. In order to reconstruct (or measure) all of MIMO channels, a reception end may require additional CSI calculation (e.g., channel interpolation and/or extrapolation and/or a related additional CSI calculation procedure).

First, the full-port mapping method is described below.

The full-port mapping method requires a new CSI-RS pattern design in order to map a CSI-RS port, not supported by the Rel-12, to an RE. In this case, the CSI-RS pattern may mean a CSI-RS resource used for CSI-RS transmission (or for a CSI-RS port) or may mean a CSI-RS resource configuration available for CSI-RS transmission (or for a CSI-RS port). For example, a new CSI-RS pattern design for the illustrated 6, 10, 12, 32 and 64 antenna ports may be defined.

Alternatively, the CSI-RS pattern supported by the current Rel-12, that is, illustrated in FIG. 8, may be reused.

In this case, a time division multiplexing (TDM) scheme for aggregating resource blocks (RBs) (or subframes) that neighbor in the time axis and mapping CSI-RSs to an RE may be used. For example, if a CSI-RS is transmitted in six antenna ports and the TDM scheme is used, a CSI-RS on two of the six CSI-RS ports may be mapped to an RE in an n subframe and a CSI-RS on four of the six CSI-RS ports may be mapped to an RE in an n+1 subframe, and the vice versa. In this case, a predefined specific CSI-RS configuration for the two CSI-RS ports may be configured in the n subframe, and a predefined specific CSI-RS configuration for the four CSI-RS ports may be configured in the n+1 subframe, and the vice versa. Furthermore, the n subframe and the n+1 subframe may be contiguous subframes or may be non-contiguous subframes.

Alternatively, a CSI-RS on two CSI-RS ports and a CSI-RS on four CSI-RS ports within the same subframe may be subjected to TDM. For example, referring to FIG. 8, a configuration for the CSI-RS on the two CSI-RS ports may be set to one of 0, 5, 10 and 11, and a configuration for the CSI-RS on the four CSI-RS ports may be set to one of 1, 2, 3, 4, 6, 7, 8 and 9.

In this case, a CSI-RS configuration for each of the two CSI-RS ports and the four CSI-RS ports may be identically defined as in the example of FIG. 8.

An eNB may transmit the CSI-RS configuration for each of the two CSI-RS ports and the four CSI-RS ports to a reception end through high layer signaling (e.g., an RRC message). The reception end may measure a channel based on the CSI-RSs transmitted in the n subframe and the n+1 subframe, and may transmit channel state information to the eNB.

Alternatively, a frequency division multiplexing (FDM) scheme for aggregating RBs neighboring in the frequency axis and mapping CSI-RSs to an RE may be used. For example, if a CSI-RS is transmitted on six antenna ports and the FDM scheme is used, a CSI-RS on two of the six CSI-RS ports may be mapped to an RE in a 2 m RB within an n subframe, and a CSI-RS on four of the six CSI-RS ports may be mapped to an RE in a 2m+1 RB within the n subframe, and the vice versa.

Alternatively, the CSI-RS on the two CSI-RS ports and the CSI-RS on the four CSI-RS ports may be subjected to FDM within the same subframe. For example, referring to FIG. 8, a configuration for the CSI-RS on the two CSI-RS ports may be set to 0, and a configuration for the CSI-RS on the four CSI-RS ports may be set to 5.

In this case, the CSI-RS configuration for each of the two CSI-RS ports and four CSI-RS ports may be identically defined as in the example of FIG. 8. In this case, the m RB and the m+1 RB may be contiguous RBs or may be non-contiguous RBs. An eNB may transmit the CSI-RS configuration for each of the two CSI-RS ports and four CSI-RS ports to a reception end through high layer signaling (e.g., an RRC message). The reception end may measure a channel based on the CSI-RSs transmitted in the m RB and m+1 RB, and may transmit channel state information to the eNB.

Alternatively, a scheme, such as code division multiplexing (CDM), may be used. For example, if a CSI-RS is transmitted on six antenna ports and the CDM scheme is used, a CSI-RS on a CSI-RS port may be mapped to the same six REs in an m RB within an n subframe, and each CSI-RS corresponding to the six antenna ports may be multiplied by different orthogonal code of a length 6 (i.e., a different row (column) in a 6×6 orthogonal code matrix orthogonal in each row (column)), and may be mapped to six REs. Furthermore, the CSI-RS on the six antenna ports may be mapped to the same 8 REs using two 4-port CSI-RS configurations or one 8-port CSI-RS configurations. In this case, each CSI-RS corresponding to the six antenna ports may be multiplied by different orthogonal code of a length 8 (i.e., 6 different rows (columns) in an 8×8 orthogonal code matrix orthogonal for each row (column)), and may be mapped to 8 REs. An eNB may transmit a CSI-RS configuration for six REs (e.g., including three 2 REs to which a non-overlapped specific 2-port CSI-RS is mapped or including 2 REs to which one non-overlapped specific 2-port CSI-RS is mapped or 4 REs to which one 4-port CSI-RS is mapped) and/or eight REs (e.g., two 4 REs to which a non-overlapped specific 4-port CSI-RS is mapped or 8 REs to which a specific 8-port CSI-RS is mapped) to which 6-port CSI-RSs are mapped to a reception end through high layer signaling (e.g., RRC message).

The reception end may measure a channel based on the CSI-RS transmitted in the six antenna ports, and may transmit channel state information to the eNB.

As described above, full-port mapping may be designed using the TDM, FDM and/or CDM scheme.

FIG. 13 is a diagram illustrating full-port mapping according to an embodiment of the present invention.

FIG. 13 shows an example of full-port mapping if (M_a, N_a, P)=(4, 4, 2).

If such a full-port mapping method is used, a reception end may measure all of MIMO channels between 32 antenna ports and a reception end antenna using a CSI-RS.

M_a (0≤M_a≤M) defined in the present invention indicates the number of antenna ports having the same polarization within the same column in the 2D-AAS, and N_a (0≤N_a≤N) indicates the number of antenna ports (or the number of +45°/−45° slant antenna port pairs in the case of a cross-polarization antenna system) (within the same column) in a horizontal direction. P indicates the number of dimensions of polarization.

In this case, the antenna port may correspond to an "antenna element" depending on a specific port-to-element virtualization.

Hereinafter, for convenience of description of the present invention, the location of each antenna port may be indicated in the form of (x, y, p) by adding a polarization part in a 2D orthogonal coordinate system as illustrated in FIG. 13, and x, y and p mean a row index, a column index and a polarization index, respectively.

Partial-port mapping is described below.

A partial-port mapping method is a method of calculating CSI or estimating all of MIMO channels using a channel measured using some CSI-RS ports.

One example of the partial-port mapping method is a method using the Kronecker product. In this method, it is assumed that a channel from a 2D-AAS to a reception end is expressed as in Equation 14.

$$H = \begin{bmatrix} H_T^{(1)} \\ H_T^{(2)} \\ \vdots \\ H_T^{(j)} \\ \vdots \\ H_T^{(N_R)} \end{bmatrix} = \begin{bmatrix} H_H^{(1)} \otimes H_V^{(1)} \\ H_H^{(2)} \otimes H_V^{(2)} \\ \vdots \\ H_H^{(j)} \otimes H_V^{(j)} \\ \vdots \\ H_H^{(N_R)} \otimes H_V^{(N_R)} \end{bmatrix}$$ [Equation 14]

In Equation 14, H means all of channels from a transmission end to a reception end, and $H_T^{(j)}$ means a channel between the transmission end and a j-th reception antenna. $H_V^{(j)}$ and $H_H^{(j)}$ mean respective channels transmitted from antenna ports in the vertical direction and the horizontal direction, respectively, to the j-th antenna of the reception end.

FIG. 14 is a diagram illustrating a partial-port mapping method according to an embodiment of the present invention.

FIG. 14 illustrates partial-port mapping based on Kronecker product for the case of (M_a, N_a, P)=(8, 4, 2).

Referring to FIG. 14, assuming that only the antenna port of a V block is) present, $H_V^{(j)}$ means a channel for the j-th antenna of a reception end from a V block antenna port. Furthermore, assuming that only the antenna port of an H block is present, $H_H^{(j)}$ means a channel for the j-th antenna of a reception end from the antenna of an H block.

In FIG. 14, a −45° slant antenna port '\' and a +45° slant antenna port '/' indicate different antenna ports. In this case, four '\' and '/' antenna ports have been configured in the H block, and eight '/' antenna ports have been configured in the V block.

That is, an eNB may transmit a CSI-RS to a reception end through each of antenna ports included in the antenna ports of the V block and the antenna ports of the H block.

A reception end measures a channel (e.g., computes QCI) from a transmission end to the reception end using a CSI-RS transmitted through each antenna port. That is, the reception end measures a channel (i.e., derives $H_V^{(j)}$) from a V block antenna port to a reception end j-th antenna using a CSI-RS transmitted through the V block antenna port, and measures a channel (i.e., derives $H_H^{(j)}$) from an H block antenna port to the reception end j-th antenna using a CSI-RS transmitted through the H block antenna port. Furthermore, the reception end may measure a channel from all of transmission end antenna ports to the reception end j-th antenna although only the CSI-RSs transmitted through the V block antenna port and the H block antenna port are used by performing Kronecker product on $H_V^{(j)}$ and $H_H^{(j)}$. Furthermore, the reception end transmits channel state information (CSI) to an eNB. As in other antennas, the reception end may measure a channel from all of transmission end antenna ports to all of the antennas of the reception end.

Hereinafter, for convenience of description of the present invention, a description is given from the point of view of one specific reception antenna, and all of processes may be identically applied to other reception antennas. That is, in the following description, as in Equation 15, only a channel from the transmission end to one specific reception antenna from which (j) has been removed is described.

$$H_T = H_H \otimes H_V \quad \text{[Equation 15]}$$

Equation 15 is an equation suitable for a case where a channel is formed of only one path not a multi-path. If a multi-path is formed, the Kronecker product property may be better satisfied as a dominant path has high power compared to other paths. However, in an actual channel environment in which a plurality of paths is formed, the Kronecker product property may not be satisfied. For example, the Kronecker product property may well operate in a line of sight (LOS) environment, but may not well operate in other cases.

Accordingly, the present invention proposes a method for efficiently reconstructing all of MIMO channels using the channels of some antenna ports.

More specifically, from the point of view that all of channels are reconstructed using the channels of some antenna ports, as in the example of FIG. 14, it may be more efficient to dispose an antenna port to be used for an RS in the boundary (or edge) of all of antenna ports in the spatial domain than to use "separated sets of CSI-RS resources" in which channel reconstruction according to Kronecker product computation is considered. This is described below with reference to the following drawing.

Hereinafter, in the description of the present invention, a row/column located in a boundary (or edge) in a 2D antenna port array means a row located at the top or bottom/column located on the rightmost side or leftmost side in a 2D antenna port array. Furthermore, an antenna port located at a vertex in a 2D antenna port array means an antenna port located at the top left/bottom left/top right/bottom right in the 2D antenna port array.

FIG. 15 is a diagram illustrating a partial-port mapping method according to an embodiment of the present invention.

FIG. 15 illustrates partial-port mapping in the case of (M_a, N_a, P)=(4, 4, 2).

In FIG. 15, antenna ports having a channel to be reconstructed (or interpolated or extrapolated) (i.e., antenna ports to which an RS has not been mapped, that is, antenna ports not used for RS transmission) are concentrated inside antenna ports in which an RS is transmitted compared to FIG. 14. If a proper interpolation algorithm is used, a reception end's ability to reconstruct all of channels may be better than that of the method of FIG. 14.

In FIG. 15, an antenna port indicated by a quadrangle indicates an antenna port which is not mapped to a CSI-RS in both polarizations (i.e., antenna ports not used for RS transmission).

Hereinafter, each of +45°/−45° slant antenna ports has been specified in the form of (x, y, p) as in the example of FIG. 13 and described.

Furthermore, in FIG. 15, an antenna port indicated by '/' and '\' indicates an antenna port to which a CSI-RS is mapped (i.e., an antenna port used for CSI-RS transmission), and means that a CSI-RS is transmitted on a corresponding antenna port from an eNB to a reception end. That is, to map a CSI-RS to a specific antenna port means that a CSI-RS is transmitted on the corresponding antenna port.

Option 1: a CSI-RS may be mapped to an antenna port of a specific polarization located in a boundary (or edge) (i.e., an antenna port located in a right/left boundary column and a top/bottom boundary row) and an antenna port of another polarization located in any one vertex (i.e., an antenna port located in any one of a top left, top right, bottom left and bottom right) in the entire antenna port spatial domain of a 2D-AAS. In this case, in the case of a co-polarization antenna array, a CSI-RS may be mapped to only an antenna port located in a boundary (or edge) in the entire antenna port spatial domain of a 2D-AAS.

FIG. 15(a) illustrates a case where a CSI-RS is mapped to a +45° slant antenna port '/' of the boundary (or edge) of the entire antenna port spatial domain and a −45° slant antenna port '\' located at a bottom left vertex. In FIG. 15(a), a cross-polarization has been assumed, but as described above, a −45° slant antenna port '\' may be omitted in the case of a co-polarization antenna array.

First, a reception end may measure a channel from a corresponding antenna port to the reception end using the CSI-RS mapped to the +45° slant antenna port '/' located in the boundary of the 2D-AAS. Furthermore, the reception end may measure the channel from the corresponding antenna port to the reception end using a CSI-RS mapped to a '\' antenna port located in (0,0,1).

Furthermore, the reception end may reconstruct channels between '/' antenna ports located in portions indicated by squares (i.e., antenna ports to which a CSI-RS has not been mapped) and the reception end using an interpolation method (or extrapolation method) based on the measured channel value.

In this case, the reception end may compute a channel for antenna ports to which a CSI-RS has not been mapped (i.e., a channel from antenna ports to which a CRS-RS has not been mapped to the reception end) by interpolating (or extrapolating) channels for antenna ports located in the same row. For example, the reception end may compute a channel for the (2,1,0) antenna port by interpolating a channel for the (2,0,0) antenna port and a channel for the (2,3,0) antenna port.

Alternatively, the reception end may compute a channel for antenna ports to which a CSI-RS has not been mapped by interpolating (or extrapolating) a channel for antenna ports located in the same column. For example, the reception end may compute a channel for the (2,1,0) antenna port by interpolating a channel for the (3,1,0) antenna port and a channel for the (0,1,0) antenna port.

Alternatively, the reception end may compute a channel for antenna ports to which a CSI-RS has not been mapped using an average value (or weighted average value) or the median of a value obtained by interpolating (or extrapolating) channels for antenna ports located in the same row and a value obtained by interpolating (or extrapolating) channels for antenna ports located in the same column. For example, the reception end may compute the channel for the (2,1,0) antenna port using an average value (or weighted average value) or the median of a value obtained by interpolating the channel for the (2,0,0) antenna port and the channel for the (2,3,0) antenna port and a value obtained by interpolating the channel for the (3,1,0) antenna port and the channel for the (0,1,0) antenna port.

As described above, the reception end can reconstruct all of the channels between all of the '/' antenna ports (i.e., (x,y,0)) and the reception end through the interpolation (or extrapolation).

Furthermore, the reception end may reconstruct channels between all of the '\' antenna ports (i.e., (x,y,1)) and the reception end using all of the channels between the reconstructed '/' antenna ports and the reception end and a measured channel between an antenna port located in (0,0,1) and the reception end.

For example, the reception end may reconstruct the channels between all of the '\' antenna ports (i.e., (x,y,1)) and the reception end using a method, such as Kronecker Product between the measured channel between the antenna port located in (0,0,1) and the reception end and a channel matrix between all of the '/' antenna ports (i.e., (x,y,0)) reconstructed using the aforementioned interpolation method (or extrapolation method) and the reception end.

As described above, the reception end may reconstruct channels between all of the '\' antenna ports (i.e., (x,y,1)) and the reception end and channels between the '/' antenna ports (i.e., (x,y,0)) and the reception end using CSI-RSs mapped to some antenna ports.

Option 2: a CSI-RS may be mapped to an antenna port of a specific polarization located in the boundary (or edge) (i.e., antenna ports located in a right/left boundary column and top/bottom boundary row) and an antenna port of another polarization located at each vertex (i.e., antenna ports located in a top left, top right, bottom left and bottom right) in the entire antenna port spatial domain. In this case, in the case of a co-polarization antenna array, a CSI-RS may be mapped to only an antenna port located in a boundary (or edge) in the entire antenna port spatial domain of a 2D-AAS.

FIG. 15(b) illustrates a case where a CSI-RS is additionally mapped to '\' antenna ports located at respective vertexes in the entire antenna port spatial domain (i.e., antenna ports corresponding to (3,0,1), (3,3,1) and (0,3,1)) in the example of FIG. 15(a). In FIG. 15(b), a cross-polarization is assumed, but as described above, a −45° slant antenna port '\' may be omitted in the case of a co-polarization antenna array.

First, a reception end may measure a channel from a corresponding antenna port to the reception end using CSI-RSs mapped to +45° slant antenna ports '/' located at the boundaries (or edges) of the entire antenna port spatial domain. Furthermore, the reception end may measure the channel from the corresponding antenna port to the reception end using CSI-RSs mapped to the '\' antenna ports located in (0,0,1), (3,0,1), (3,3,1) and (0,3,1).

Furthermore, the reception end may compute channels between '/' antenna ports located in portions indicated by squares (i.e., antenna ports to which a CSI-RS has not been mapped) and the reception end using an interpolation method (or extrapolation method) based on the measured channel value.

In this case, the reception end, as described above, may reconstruct the channels for the antenna ports to which a CSI-RS has not been mapped by interpolating (or extrapolating) channels for antenna ports located in the same row or by interpolating (or extrapolating) channels for antenna ports located in the same column or using an average value (or the median) of a value obtained by interpolating (or extrapolating) the channels for the antenna ports located in the same row and a value obtained by interpolating (or extrapolating) the channels for the antenna ports located in the same column.

As described above, the reception end can reconstruct all of the channels between all of the '/' antenna ports (i.e., (x,y,0)) and the reception end through the interpolation (or extrapolation).

Furthermore, the reception end may reconstruct channels between all of the '\' antenna ports and the reception end using an interpolation method (or extrapolation method) based on the channel measured with respect to the '\' antenna port. As in the method of reconstructing the channels for the '/' antenna ports, the reception end may reconstruct a channel for antenna ports to which a CSI-RS has not been mapped by interpolating (or extrapolating) channels for antenna ports located in the same row or by interpolating (or extrapolating) channels for antenna ports located in the same column or an average value (or the median) of a value obtained by interpolating (or extrapolating) the channels for the antenna ports located in the same row and a value obtained by interpolating (or extrapolating) the channels for the antenna ports located in the same column. In this case, the reception end may first reconstruct the channels for the '\' antenna ports located in the boundaries (or edges) and then reconstruct the channels for the '\' antenna ports located inside.

Alternatively, the reception end may reconstruct all of channels for the '\' antenna ports using channels measured with respect to the '\' antenna ports and a channel characteristic between the '/' antenna ports and the reception end. Accordingly, channel matrix reconstruction performance of '\' antenna ports having polarization different from that of the '/' antenna ports can be improved.

For example, the reception end may reconstruct channels between all of the '\' antenna ports (i.e., (x,y,1)) and the reception end using a method, such as Kronecker Product between an average value (or the median) of channels for antenna ports located in (0,0,1), (3,0,1), (3,3,1) and (0,3,1) and a channel matrix between the reconstructed '/' antenna ports and the reception end. For another example, the reception end may partition all of antenna ports into four antenna sub-arrangements (e.g., {(0,0), (0,1), (1,0), (1,1)}, {(0,2), (0,3), (1,2), (1,3)}, {(2,0), (2,1), (3,0), (3,1)}, and {(2,2), (2,3), (3,2), (3,3)}), and may reconstruct channels between all of the '\' antenna ports (i.e., (x,y,1)) and the reception end using a method, such as Kronecker Product between a channel matrix between the '/' antenna ports located in each of the partitioned sub-arrangements and the reception end and channels measured with respect to the '\' antenna ports located in each sub-arrangement. That is, the '\' antenna port participating in the Kronecker Product in each sub-arrangement is located in a corresponding sub-arrangement, and may include one or a plurality of '\' antenna ports in the sub-arrangement.

As described above, the reception end may reconstruct channels between all of the '\' antenna ports (i.e., (x,y,1)) and the reception end and channels between the '/' antenna ports (i.e., (x,y,0)) and the reception end using CSI-RSs mapped to some antenna ports.

Option 3: a CSI-RS may be mapped to antenna ports of a specific polarization located in boundaries (or edges) of the entire antenna port spatial domain of a 2D-AAS (i.e., antenna ports located in a right/left boundary column and a top/bottom boundary row) and an antenna port of another polarization located in any one column or row of the 2D-AAS (i.e., an antenna port located in any one of a right boundary column, left boundary column, top boundary column and bottom boundary column). In this case, in the case of a co-polarization antenna array, a CSI-RS may be mapped to only an antenna port located in a boundary (or edge) in the entire antenna port spatial domain of the 2D-AAS.

FIG. 15(c) illustrates a case where a CSI-RS is additionally mapped to '\' antenna ports located in one row of the entire antenna port spatial domain (i.e., antenna ports corresponding to (0,1,1), (0,2,1) and (0,3,1)) in the example of FIG. 15(a). In FIG. 15(a), a cross-polarization has been assumed, but as described above, a −45° slant antenna port '\' may be omitted in the case of a co-polarization antenna array.

First, a reception end may measure a channel from a corresponding antenna port to the reception end using a CSI-RS mapped to a +45° slant antenna port '/' located in a boundary (or edge) in the entire antenna port spatial domain. Furthermore, the reception end may measure the channel from the corresponding antenna port to the reception end using CSI-RSs mapped to '\' antenna ports located in (0,0,1), (0,1,1), (0,2,1) and (0,3,1).

Furthermore, the reception end may compute channels between the '/' antenna ports located in portions indicated by squares (i.e., antenna ports to which a CSI-RS has not been mapped) and the reception end using an interpolation method (or extrapolation method) based on the measured channel value. In this case, the reception end, as described above, may reconstruct the channels for the antenna ports to which a CSI-RS has not been mapped by interpolating (or extrapolating) channels for antenna ports located in the same row or by interpolating (or extrapolating) channels for antenna ports located in the same column or using an average value (or the median) of a value obtained by interpolating (or extrapolating) the channels for the antenna ports located in the same row and a value obtained by interpolating (or extrapolating) the channels for the antenna ports located in the same column.

As described above, the reception end can reconstruct all of the channels between all of the '/' antenna ports (i.e., (x,y,0)) and the reception end through the interpolation (or extrapolation).

Furthermore, the reception end may reconstruct all of channels for the '\' antenna ports using channels measured with respect to the '\' antenna port and a channel characteristic between the '/' antenna ports and the reception end. Accordingly, channel matrix reconstruction performance of the '\' antenna ports having polarization different from that of the '/' antenna ports can be improved.

For example, the reception end may reconstruct channels between all of the '\' antenna ports (i.e., (x,y,1)) and the reception end using a method, such as Kronecker Product between an average value (or the median) of channels for the antenna port located in (0,0,1), (0,1,1), (0,2,1) and (0,3,1) and a channel matrix between the reconstructed '/' antenna ports and the reception end. For another example, the reception end may partition all of antenna ports into four antenna sub-arrangements (e.g., {(0,0), (1,0), (2,0), (3,0)}, {(0,1), (1,1), (2,1), (3,1)}, {(0,2), (1,2), (2,2), (3,2)} and {(0,3), (1,3), (2,3), (3,3)}), and may reconstruct channels between all of the '\' antenna ports (i.e., (x,y,1)) and the reception end using a method, such as Kronecker Product between a channel matrix between the '/' antenna ports located in each of the partitioned sub-arrangements and the reception end and channels measured with respect to the '\' antenna ports located in each sub-arrangement. That is, the '\' antenna port participating in the Kronecker Product in each sub-arrangement is located in a corresponding sub-arrangement, and may include one or a plurality of '\' antenna ports in the sub-arrangement.

As described above, the reception end can reconstruct channels between all of the '\' antenna ports (i.e., (x,y,1)) and the reception end and channels between the '/' antenna ports (i.e., (x,y,0)) and the reception end using CSI-RSs mapped to some antenna ports.

Option 4: if a CSI-RS is mapped to antenna ports of a specific polarization located in a boundary (or edge) of the entire antenna port spatial domain of a 2D-AAS (i.e., antenna ports located in a right/left boundary column and a top/bottom boundary row), the CSI-RS may be mapped to only some antenna ports that belong to the antenna ports and that are located in a specific row(s) (e.g., an (N_a)-th row) and a specific column(s) (e.g., an (M_a)-th column). In this case, the column interval and row interval of antenna ports in which the CSI-RSs located in the specific row(s) and specific column(s) are transmitted may be uniform or may be different.

Furthermore, a CSI-RS may be mapped to an antenna port of another polarization located in any one column or row of the entire antenna port spatial domain (i.e., an antenna port located in any one of a right boundary column, left boundary column, top boundary column and bottom boundary column). This corresponds to a method of reducing overhead of a CSI-RS in the aforementioned method of Option 3.

In this case, in the case of a co-polarization antenna array, the CSI-RS is mapped to only antenna ports located in boundaries (or edges) in the entire antenna port spatial domain of a 2D-AAS, but the CSI-RS may be mapped to some antenna ports that belong to the antenna ports and that are located in a specific row(s) and a specific column(s).

FIG. 15(d) illustrates a case where a CSI-RS is mapped to only some of the '/' antenna ports located in the third column and third row in the example of FIG. 15(c) and the intervals of the antenna ports to which the CSI-RS is mapped in the third column and third row are identically 2. That is, FIG. 15(d) illustrates a case where the CSI-RS is mapped to only the antenna ports located in (0,3,0) and (2,3,0) in the third column and the CSI-RS is mapped to only the antenna ports located in (3,0,0) and (3,2,0) in the third row.

In FIG. 15(d), a cross-polarization has been assumed, but as described above, a −45° slant antenna port '\' may be omitted in the case of a co-polarization antenna array.

First, a reception end may measure a channel from a corresponding antenna port to the reception end using a CSI-RS mapped to a +45° slant antenna port '/' located in a boundary (or edge) of a 2D-AAS. Furthermore, the reception end may measure the channel from the corresponding antenna port to the reception end using CSI-RSs mapped to the '\' antenna ports located in (0,0,1), (0,1,1), (0,2,1) and (0,3,1).

Furthermore, the reception end may compute channels between '/' antenna ports located in portions indicated by squares (i.e., antenna ports to which a CSI-RS has not been mapped) and the reception end using an interpolation method (or extrapolation method) based on the measured channel value. In this case, the reception end, as described above, may reconstruct the channels for the antenna ports to which a CSI-RS has not been mapped by interpolating (or extrapolating) channels for antenna ports located in the same row or by interpolating (or extrapolating) channels for antenna ports located in the same column or using an average value (or the median) of a value obtained by interpolating (or extrapolating) the channels for the antenna ports located in the same row and the value obtained by interpolating (or extrapolating) the channels for the antenna ports located in the same column.

As described above, the reception end can reconstruct all of the channels between all of the '/' antenna ports (i.e., (x,y,0)) and the reception end through the interpolation (or extrapolation).

Furthermore, the reception end may reconstruct all of the channels for the '\' antenna ports using channels measured with respect to the '\' antenna ports and a channel characteristic between the '/' antenna ports and the reception end. Accordingly, channel matrix reconstruction performance of the '\' antenna ports having polarization different from that of the '/' antenna ports can be improved.

For example, the reception end may reconstruct channels between all of the '\' antenna ports (i.e., (x,y,1)) and the reception end using a method, such as Kronecker Product between an average value (or the median) of channels for the antenna ports located in (0,0,1), (0,1,1), (0,2,1) and (0,3,1) and a channel matrix between the reconstructed '/' antenna ports and the reception end. For another example, the reception end may partition all of antenna ports into four antenna sub-arrangements (e.g., {(0,0), (1,0), (2,0), (3,0)}, {(0,1), (1,1), (2,1), (3,1)}, {(0,2), (1,2), (2,2), (3,2)} and {(0,3), (1,3), (2,3), (3,3)}), and may reconstruct channels between all of the '\' antenna ports (i.e., (x,y,1)) and the reception end using a method, such as Kronecker Product between a channel matrix between the '/' antenna ports located in each of the partitioned sub-arrangements and the reception end and channels measured with respect to the '\' antenna ports located in each sub-arrangement. That is, the '\' antenna port participating in the Kronecker Product in each sub-arrangement is located in a corresponding sub-arrangement, and may include one or a plurality of '\' antenna ports in the sub-arrangement.

As described above, the reception end can reconstruct channels between all of the '\' antenna ports (i.e., (x,y,1)) and the reception end and channels between the '/' antenna ports (i.e., (x,y,0)) and the reception end using CSI-RSs mapped to some antenna ports.

In another partial-port mapping method according to an embodiment of the present invention, a CSI-RS may be mapped to antenna ports of a specific polarization having uniform intervals in the entire antenna port spatial domain of a 2D-AAS. This is described with reference to the following drawing.

FIG. 16 is a diagram illustrating a partial-port mapping method according to an embodiment of the present invention.

As in FIG. 16, '/' antenna ports used for an RS (i.e., antenna ports to which an RS has been mapped) may be uniformly disposed in the entire antenna port spatial domain.

Hereinafter, in the antenna port spatial domain, to dispose antenna ports used for an RS within the same row at the same column intervals or to dispose antenna ports used for an RS within the same column at the same row interval is referred to as partial uniform mapping or uniform mapping.

FIG. 16 illustrates a case where the number of '\' antenna ports used for CSI-RSs is 1, but the present invention is not limited thereto. That is, as in the example of FIG. 15, '\' antenna ports located at respective vertexes in the entire antenna port spatial domain may be used for a CSI-RS or '\' antenna ports located in a specific row/column may be used for a CSI-RS.

Furthermore, in FIG. 16, a cross-polarization has been assumed, but as described above, a −45° slant antenna port '\' may be omitted in the case of a co-polarization antenna array.

Since antenna ports used for an RS are disposed at uniform intervals in the entire antenna port spatial domain, the intervals of the antenna ports used for an RS and antenna ports not used for an RS are uniform. As a result, the ability to reconstruct all of channels in a reception end may be more excellent because antennas used for an RS efficiently cover the entire antenna port spatial domain.

In FIG. 16, the degree (i.e., interval) that antenna ports to be used for an RS are dense may be controlled by introducing a step size μ.

In this case, the step size μ indicates a column interval between '/' antenna ports using an RS in the same row or the row interval of antenna ports using an RS in the same column in a 2D-AAS, as in the example of FIG. 16.

For example, if the step size is 1, it corresponds to full-port mapping.

FIG. 16(a) illustrates a partial-port mapping method when the step size is 2, and FIG. 16(b) illustrates a partial-port mapping method when the step size is 3.

Referring to FIG. 16(a), '/' antenna ports used for CSI-RSs in each row may be disposed at intervals of the step size μ=2. That is, the '/' antenna ports distant (spaced) at the intervals of the step size μ=2 in each row may be used for CSI-RS transmission.

Referring to FIG. 16(b), '/' antenna ports used for CSI-RSs in each row may be disposed at an interval of the step size μ=3. That is, the '/' antenna ports distant (spaced) at the interval of the step size μ=3 in each row may be used for CSI-RS transmission.

Furthermore, in order to transmit a CSI-RS using the '/' antenna ports distant (spaced) at uniform intervals in the entire antenna port spatial domain, the location of the '/' antenna port used for a CSI-RS for each row may be shifted in a horizontal direction at one interval (i.e., the step size=1) as in FIGS. 16(a) and 16(b).

Meanwhile, the part-port mapping method illustrated in FIG. 16 is only one example, and the present invention is not limited thereto. That is, the '/' antenna port used for a CSI-RS in each column may be disposed at a step size interval. That is, the '/' antenna ports distant (spaced) at an interval of a step size in each column may be used for CSI-RS transmission. In this case, the location of a '/' antenna port used for a CSI-RS for each column may be shifted in a vertical direction at one interval (i.e., the step size=1).

The accuracy of channel measurement is the highest when μ=1. As the value increases, the accuracy may be reduced. In contrast, overhead of a CSI-RS is reduced.

In this case, the reception end may reconstruct channels for antenna ports not using an RS (i.e., antenna ports to which an RS has not been mapped) using the interpolation method or extrapolation method based on a channel measurement result for antenna ports using an RS. In this case, the reception end, as described above, may reconstruct the channels for the antenna ports to which a CSI-RS has not been mapped by interpolating (or extrapolating) channels for antenna ports located in the same row or by interpolating (or extrapolating) channels for antenna ports located in the same column or using an average value (or the median) of a value obtained by interpolating (or extrapolating) the channels for the antenna ports located in the same row and a value obtained by interpolating (or extrapolating) the channels for the antenna ports located in the same column.

The present invention proposes a method of reconstructing a channel using a sample channel covariance matrix from among channel reconstruction methods based on the interpolation method or extrapolation method. In this case, in order to effectively reconstruct a channel, the values of a sample channel covariance matrix need to be accurate.

To this end, the present invention proposes a method using a (CSI-RS port) partial mapping (e.g., uniform partial mapping) pattern different for each instance as in FIG. 16.

For example, whenever an instance is changed, the location of an antenna port used for a CSI-RS may be shifted at a specific interval (e.g., a step size=1) in a horizontal direction/vertical direction. However, although the instance is changed, the location of an antenna port pattern used for a CSI-RS can be identically maintained by maintaining the step size.

As described above, if the location of an antenna port used for a CSI-RS is shifted at an interval of a step size=1 in the horizontal direction/vertical direction whenever an instance is changed while the location of the antenna port pattern is identically maintained, the aggregation of antenna ports used for CSI-RSs within an instance corresponding to a step size (i.e., the first and the second instances if the step size=2) may be the same as all of antenna ports.

In this method, the period of the instance may be set for each fame (or subframe). Furthermore, the period of the instance may be a predefined period or may be a period designated by an eNB.

The relation between each instance and a uniform mapping pattern (i.e., the location of an antenna port used for a CSI-RS) may be determined according to a round-robin method based on a value of the step size $\mu$. That is, the locations of antenna ports used for CSI-RSs in all of antenna port arrays may be determined based on a value of the step size $\mu$, and the locations of all of antenna ports used for CSI-RSs may be shifted at a specific interval in the horizontal direction (row)/vertical direction (column) whenever an instance is changed.

Whenever each instance is changed as in FIG. 16(*a*), the locations of antenna ports used for CSI-RSs may be shifted at one interval (e.g., the step size=1) in the horizontal direction while the value of the step size $\mu=2$ is maintained in the entire antenna port spatial domain. In this case, since the step size $\mu=2$, the aggregation of antenna ports used for CSI-RSs in the first instance and the second instance may be the same as all the antenna ports.

Likewise, as in FIG. 16(*b*), the locations of antenna ports used for CSI-RSs may be shifted at one interval (e.g., a step size=1) in the horizontal direction while the value of the step size $\mu$ is maintained in the entire antenna port spatial domain whenever each instance is changed. In this case, since the step size $\mu=3$, the aggregation of antenna ports used for CSI-RSs in the first instance, the second instance and the third the instance may be the same as all the antenna ports.

For another example, the locations of all of antenna ports used for CSI-RSs may be shifted at one interval (e.g., a step size=1) in the vertical direction while the value of the step size $\mu$ is maintained in the entire antenna port spatial domain whenever each instance is changed.

Alternatively, an eNB may notify a reception end of the location of an antenna port used for a CSI-RS in the entire antenna port spatial domain for each instance.

As described above, if a different uniform partial mapping pattern is used for each instance, a reception end may reconstruct all of channels from all of antenna ports to the reception end using the interpolation method or extrapolation method based on channel information measured according to a uniform mapping pattern provided for each instance.

In this case, the reception end, as described above, may reconstruct the channels for the antenna ports to which a CSI-RS has not been mapped by interpolating (or extrapolating) channels for antenna ports located in the same row or by interpolating (or extrapolating) channels for antenna ports located in the same column or using an average value (or the median) of a value obtained by interpolating (or extrapolating) the channels for the antenna ports located in the same row and a value obtained by interpolating (or extrapolating) the channels for the antenna ports located in the same column.

Furthermore, the reception end may compute an instant channel covariance matrix using a channel measured using all of the reconstructed MIMO channels or RSs.

Furthermore, the reception end may correct sample channel covariance matrix values by updating the value.

Option 5: referring to FIG. 16, first, in the first instance, a reception end measures a channel from a corresponding antenna port to the reception end using a CSI-RS mapped to a +45° slant antenna port '/' using a given uniform mapping pattern. Furthermore, the reception end may measure the channel from the corresponding antenna port to the reception end using a CSI-RS mapped to the '\' antenna port located in (0,0,1).

Furthermore, the reception end may reconstruct channels between '/' antenna ports located in portions indicated by squares (i.e., antenna ports to which a CSI-RS has not been mapped) and the reception end using an interpolation method (or extrapolation method) based on the measured channel value.

In this case, the reception end, as described above, may reconstruct the channels for the antenna ports to which a CSI-RS has not been mapped by interpolating (or extrapolating) channels for antenna ports located in the same row or by interpolating (or extrapolating) channels for antenna ports located in the same column or using an average value (or the median) of a value obtained by interpolating (or extrapolating) the channels for the antenna ports located in the same row and a value obtained by interpolating (or extrapolating) the channels for the antenna ports located in the same column.

As described above, the reception end can reconstruct all of the channels between all of the '/' antenna ports (i.e., (x,y,0)) and the reception end through the interpolation (or extrapolation).

Furthermore, the reception end may reconstruct channels between all of the '\' antenna ports (i.e., (x,y,1)) and the reception end using all of the channels between the reconstructed '/' antenna ports and the reception end and a measured channel between the antenna port located in (0,0,1) and the reception end.

For example, the reception end may reconstruct the channels between all of the '\' antenna ports (i.e., (x,y,1)) and the reception end using a method, such as Kronecker Product between the measured channel between the antenna port located in (0,0,1) and the reception end and a channel matrix between all of the '/' antenna ports (i.e., (x,y,0)) reconstructed using the aforementioned interpolation method (or extrapolation method) and the reception end.

As described above, the reception end may reconstruct the channels between all of the '\' antenna ports (i.e., (x,y,1)) and the reception end and the channels between the '/' antenna ports (i.e., (x,y,0)) and the reception end using CSI-RSs mapped to some antenna ports.

Furthermore, the reception end computes an instant channel covariance matrix using all of the reconstructed MIMO channels or measured MIMO channels, and corrects a sample channel covariance matrix.

Next, even in the second instance, the reception end reconstructs all of MIMO channels using a designated uniform mapping pattern as in the channel reconstruction method in the first instance.

Furthermore, the reception end corrects a sample channel covariance matrix using all of the reconstructed MIMO channels or measured MIMO channels.

In FIG. 16(b), even in the third instance, the reception end reconstructs all of MIMO channels using a designated uniform mapping pattern as in the channel reconstruction method in the first instance. Furthermore, the reception end corrects a sample channel covariance matrix using all of the reconstructed MIMO channels or measured MIMO channels.

Meanwhile, the '\' antenna port may be located in the same row and column as the '/' antenna port in which a CSI-RS is transmitted as in FIG. 16, but may be located in a specific location previously agreed with an eNB.

A reception end sequentially repeats such a channel reconstruction process using a uniform mapping pattern according to a step size μ during the time for which the reception end communicates with the same eNB(s) without a sudden change in the channel attributable to a great change in speed or a change in location.

Meanwhile, the reception end may report the results (i.e., channel state information) of the measurement of all of MIMO channels to an eNB for each instance or may report the results (i.e., channel state information) of the measurement of all of MIMO channels in all of instances (i.e., in the first and the second instances in the case of FIG. 16(a) and in the first, the second, the third instances in the case of FIG. 16(b)) to an eNB.

FIG. 17 is a diagram illustrating a partial-port mapping method according to an embodiment of the present invention.

FIG. 17 illustrates a case where a uniform mapping pattern including −45° slant antenna port '\'s has been added in order to improve channel reconstruction performance between the −45° slant antenna port '\'s and the reception end in the aforementioned method of FIG. 16.

FIG. 17 illustrates a case where the number of '\' antenna ports used for a CSI-RS is 1 in first and third instances and likewise the number of '/' antenna ports used for a CSI-RS is 1 in second and fourth instances, but the present invention is not limited thereto. That is, as in the example of FIG. 15, '\' antenna ports (and/or '/' antenna ports) located at respective vertexes in the entire antenna port spatial domain may be used for a CSI-RS or '\' antenna ports (and/or '/' antenna ports) located in a specific row/column may be used for a CSI-RS.

Furthermore, FIG. 17 illustrates a partial-port mapping method when a step size is 2, but the present invention is not limited thereto. Antenna ports to which a CSI-RS has been mapped with a different step size may be disposed.

However, FIG. 17 corresponds to a case where the uniform mapping pattern including the −45° slant antenna port '\'s has been added. Accordingly, the location of an antenna port used for a CSI-RS may be shifted at a specific interval (e.g., a step size=1) in the horizontal direction/vertical direction in a 2-instance period. In this case, if the step size is maintained although the instance is changed, the location of an antenna port pattern used for a CSI-RS can be identically maintained.

As described above, if the location of an antenna port is shifted by a step size=1 in the horizontal direction/vertical direction whenever two instances are changed while the location of an antenna port pattern used for a CSI-RS is identically maintained, the aggregation of antenna ports used for a CSI-RS within four (i.e., a step size*2) instances may be the same as all of antenna ports.

Referring to FIG. 17, in the first instances, a reception end measures a channel from a corresponding antenna port to the reception end using a CSI-RS mapped to a +45° slant antenna port '/' using a given uniform mapping pattern. Furthermore, the reception end may measure the channel from the corresponding antenna port to the reception end using a CSI-RS mapped to a '\' antenna port located in (0,0,1).

Furthermore, the reception end may reconstruct channels between '/' antenna ports located in portions indicated by square (i.e., antenna ports to which a CRS-RS has not been mapped) and the reception end using an interpolation method (or extrapolation method) based on the measured channel value.

In this case, the reception end, as described above, may reconstruct the channels for the antenna ports to which a CSI-RS has not been mapped by interpolating (or extrapolating) channels for antenna ports located in the same row or by interpolating (or extrapolating) channels for antenna ports located in the same column or an average value (or the median) of a value obtained by interpolating (or extrapolating) the channels for the antenna ports located in the same row and a value obtained by interpolating (or extrapolating) the channels for the antenna ports located in the same column.

As described above, the reception end can reconstruct all of the channels between all of the '/' antenna ports (i.e., (x,y,0)) and the reception end through the interpolation (or extrapolation).

Furthermore, the reception end may reconstruct channels between all of the '\' antenna ports (i.e., (x,y,1)) and the reception end using all of the channels between the reconstructed '/' antenna ports and the reception end and a measured channel between the antenna port located in (0,0,1) and the reception end.

For example, the reception end may reconstruct the channels between all of the '\' antenna ports (i.e., (x,y,1)) and the reception end using a method, such as Kronecker Product between the measured channel between the antenna port located in (0,0,1) and the reception end and a channel matrix between all of the '/' antenna ports (i.e., (x,y,0)) reconstructed using the aforementioned interpolation method (or extrapolation method) and the reception end.

As described above, the reception end may reconstruct the channels between all of the '\' antenna ports (i.e., (x,y,1)) and the reception end and the channels between the '/' antenna ports (i.e., (x,y,0)) and the reception end using CSI-RSs mapped to some antenna ports.

Furthermore, the reception end computes an instant channel covariance matrix using all of the reconstructed MIMO channels or measured MIMO channels, and corrects a sample channel covariance matrix.

Next, in the second instance, the reception end measures a channel from a corresponding antenna port to the reception end using a CSI-RS mapped to a −45° slant antenna port '\' using a given uniform mapping pattern. Furthermore, the reception end may measure a channel from the corresponding antenna port to the reception end using a CSI-RS mapped to a '/' antenna port located in (0,0,0).

Furthermore, the reception end may reconstruct channels between '\' antenna ports located in portions indicated by squares (i.e., antenna ports to which a CRS-RS has not been mapped) and the reception end using an interpolation method (or extrapolation method) based on the measured channel value.

In this case, the reception end, as described above, may reconstruct the channels for the antenna ports to which a CSI-RS has not been mapped by interpolating (or extrapolating) channels for antenna ports located in the same row or by interpolating (or extrapolating) channels for antenna ports located in the same column or using an average value (or the median) of a value obtained by interpolating (or extrapolating) the channels for the antenna ports located in the same row and a value obtained by interpolating (or extrapolating) the channels for the antenna ports located in the same column.

As described above, the reception end can reconstruct all of the channels between all of the '\' antenna ports (i.e., (x,y,1)) and the reception end through the interpolation (or extrapolation).

Furthermore, the reception end may reconstruct channels between all of the '/' antenna ports (i.e., (x,y,0)) and the reception end using all of the channels between the reconstructed '\' antenna ports and the reception end and a measured channel between the antenna port located in (0,0,0) and the reception end.

For example, the reception end may reconstruct the channels between all of the '/' antenna ports (i.e., (x,y,0)) and the reception end using a method, such as Kronecker Product between the measured channel between the antenna port located in (0,0,0) and the reception end and a channel matrix between all of the '\' antenna ports (i.e., (x,y,1)) reconstructed using the aforementioned interpolation method (or extrapolation method) and the reception end.

As described above, the reception end may reconstruct the channels between all of the '\' antenna ports (i.e., (x,y,1)) and the reception end and the channels between the '/' antenna ports (i.e., (x,y,0)) and the reception end using CSI-RSs mapped to some antenna ports.

Furthermore, the reception end corrects a sample channel covariance matrix using all of the reconstructed MIMO channels or measured MIMO channels.

Next, even in the third instance, the reception end reconstructs all of MIMO channels using a designated uniform mapping pattern as in the channel reconstruction method in the first instance.

Furthermore, the reception end corrects a sample channel covariance matrix using all of the reconstructed MIMO channels or measured MIMO channels.

Next, even in the fourth instance, the reception end reconstructs all of MIMO channels using a designated uniform mapping pattern as in the channel reconstruction method in the second instance.

Furthermore, the reception end corrects a sample channel covariance matrix using all of the reconstructed MIMO channels or measured MIMO channels.

Meanwhile, in the first and the third instances, the '\' antenna may be located in the same row and column as the '/' antenna port in which a CSI-RS is transmitted as in FIG. 17 or may be located in a specific location previously agreed with an eNB. Likewise, in the second and the fourth instances, the '/' antenna may be located in the same row and column as the '\' antenna port in which a CSI-RS is transmitted as in FIG. 17 or may be located in a specific location previously agreed with an eNB.

In this case, the reception end may report the results (i.e., channel state information) of the measurement of all of the MIMO channels to an eNB for each instance or may report the results (i.e., channel state information) of the measurement of all of the MIMO channels in all of the instance (i.e., the first to the fourth instances in FIG. 17).

Meanwhile, the method of correcting a sample channel covariance matrix descried in FIGS. 16 and 17 may include the method described in FIG. 15 and may be identically applied to any partial-port mapping method.

For example, the partial-port mapping method illustrated in FIG. 15 may be applied to the first instance. A method of mapping a CSI-RS to an antenna port to which a CSI-RS has not been mapped in the first instance and not mapping a CSI-RS to an antenna port to which a CSI-RS has been mapped in the first instance may be applied to the second instance.

Furthermore, the methods described in FIGS. 15 to 17 have been described in the case of the cross-polarization antenna system (P=2), but the present invention is not limited thereto. That is, the methods proposed by the present invention may be evidently applied to a co-polarization antenna system (P=1).

In the case of the aforementioned methods, it is important for the reception end to be aware of that an RS transmitted by an eNB is an RS mapped to an antenna port at which location in the 2D-AAS.

To this end, the eNB may transmit information of M_a, N_a and P indicative of the size of the 2D-AAS to each reception end as in FIG. 13. That is, the eNB may transmit information about the number of antenna ports M_a having the same polarization within the same column in all of antenna arrays, the number of antenna ports N_a in the horizontal direction (within the same column) (or in the case of a cross-polarization antenna system, the number of +45°/−45° slant antenna port pairs), and the number of dimensions of polarization P to the reception end.

Furthermore, the eNB may use the following method in order to notify the reception end of the index and location of an antenna port to which a CSI-RS has been mapped.

Full-Port Mapping

Hereinafter, a method of allocating an antenna port index in full-port mapping is described with reference to FIG. 18.

FIG. 18 illustrates the allocation of antenna port indices in full-port mapping according to an embodiment of the present invention.

Hereinafter, a case where the location of each antenna port is indicated in the form of (x, y, p) in a 2D orthogonal coordinate system for all of antenna port arrays as in the example of FIG. 13 is assumed and described, for convenience of description. In this case, x, y and p mean a row index, a column index and a polarization index, respectively.

FIG. 18 illustrates a case where all of antenna port arrays have been configured in (M_a, N_a, P)=(2, 4, 2), but the present invention is not limited thereto. That is, although all of antenna port arrays have been configured in different sizes/forms, the following antenna port indexing method may be identically applied.

A) Method 1: referring to FIG. 18(*a*), port indexes may be first allocated to '/' antenna ports in a horizontal direction (i.e., row) using an antenna port at a (0,0,0) location as a start point. Thereafter, port indices may be allocated at '\' antenna ports.

That is, the port indices may be allocated to the antenna ports from the antenna port at the (0,0,0) location to the column index y of an antenna port, the row index x of an antenna part, and finally in order that a polarization index p is increased.

This is described in more detail. The port indices are allocated to the antenna ports in order that the column index y of the antenna port is increased, starting from the antenna port at the (0,0,0) location. When the column index y reaches a maximum value N_a, the row index x is increased, and a port index is allocated to an antenna port in order that the column index y of an antenna port having the increased row index x is increased.

Thereafter, when the row index x reaches a maximum value M_a, the polarization index p is increased. The above process is repeatedly performed on an antenna port having an increased polarization index p.

Thereafter, when the polarization index p reaches a maximum value P, the antenna port indexing process is completed.

B) Method 2: referring to FIG. 18(*b*), port indexes may be first allocated to '/' antenna ports in a lower row using an antenna port at a (0,0,0) location as a start point. Thereafter, the port indices may be allocated to '\' antenna ports in the same row. Furthermore, the port indices may be allocated to antenna ports in a row right above the previous row in the same manner.

That is, the port indices may be allocated to the antenna ports from the antenna port at the (0,0,0) location to the column index y of an antenna port, a polarization index p, and finally in order that the row index x is increased.

This is described in more detail. The port indices are allocated to the antenna ports in order that the column index y of the antenna port is increased, starting from the antenna port at the (0,0,0) location. When the column index y reaches a maximum value N_a, the polarization index p is increased. Port indices are allocated to antenna ports in order that the column index y of an antenna port having an increased polarization index p is increased.

Thereafter, when the polarization index p reaches a maximum value P, the row index x is increased. The above process is repeatedly performed on an antenna port having the increased row index x.

Thereafter, when the row index x reaches a maximum value M_a, the antenna port indexing process is completed.

C) Method 3: referring to FIG. 18(*c*), port indexes may be first allocated to '/' antenna ports in the vertical direction using an antenna port at a (0,0,0) location as a start point. Thereafter, port indexes may be allocated to '\' antenna ports.

That is, the port indices may be allocated to the antenna ports from the antenna port at the (0,0,0) location to the row index x of an antenna port, a column index y, and finally in order that a polarization index p is increased.

This is described in more detail. The port indices are allocated to the antenna ports in order that the row index x of the antenna port is increased, starting from the antenna port at the (0,0,0) location. When the row index x reaches a maximum value M_a, the column index y is increased, and port indices are allocated to antenna ports in order that the row index x of an antenna port having the increased column index y is increased.

Thereafter, when the column index y reaches a maximum value N_a, the polarization index p is increased. The above process is repeatedly performed on an antenna port having an increased polarization index p.

Thereafter, when the polarization index p reaches a maximum value P, the antenna port indexing process is completed.

D) Method 4: referring to FIG. 18(*d*), port indexes are first allocated to '/' antenna ports in a left column using an antenna port at a (0,0,0) location as a start point. Thereafter, port indexes are allocated to '\' antenna ports in the same column. Furthermore, port indexes are allocated to antenna ports in a column on the right of the same column in the same manner.

That is, the antenna ports are allocated to the port indexes from the antenna port at the (0,0,0) location to the row index x of an antenna port, a polarization index p, and finally in order that a column index y is increased.

This is described in more detail. The port indices are allocated to the antenna ports in order that the row index x of the antenna port is increased, starting from the antenna port at the (0,0,0) location. When the row index x reaches a maximum value M_a, the polarization index p is increased. Port indices are allocated to antenna ports in order that the row index x of an antenna port having an increased polarization index p is increased.

Thereafter, when the polarization index p reaches a maximum value P, a column index y is increased. The above process is repeatedly performed on an antenna port having an increased column index y.

Thereafter, when the column index y reaches a maximum value N_a, the antenna port indexing process is completed.

FIG. 18 illustrates the four types of antenna port indexing methods, but the present invention is not limited thereto. An indexing method may be defined using a specific rule.

Any one of the aforementioned antenna port indexing methods may be previously defined between an eNB and a reception end. In this case, the eNB may transmit only information of M_a, N_a and P indicative of the size of a 2D-AAS to the reception end. The reception end can be aware of the location of each antenna port within the 2D-AAS of the eNB through the predefined antenna port indexing method.

Alternatively, the eNB may transmit information indicative of a determined antenna port indexing method of a plurality of predefined antennas port indexing methods, such as the aforementioned antenna port indexing methods, to the reception end. In this case, the eNB may transmit information indicative of an antenna port indexing method to the reception end along with information of M_a, N_a and P indicative of the size of a 2D-AAS. The reception end can be aware of the location of each antenna port within the 2D-AAS of the eNB through the received information.

Partial-Port Mapping

A) Method 1: an eNB may explicitly notify a reception end of an antenna port location where a CSI-RS is transmitted and/or a port index with respect to antenna ports mapped to a CSI-RS.

In this case, the eNB may transmit the location of each antenna port to the reception end in the form of (x, y, p) along with the size of all of antenna port arrays in a 2D orthogonal coordinate system for all of antenna port arrays, as in the example of FIG. 13. Furthermore, the eNB may transmit a port index corresponding to the location of each antenna port to the reception end.

Alternatively, if a specific antenna port indexing method has been predefined as in the example of FIG. 18, the eNB may transmit only the size of all of antenna port arrays and antenna port indexes to the reception end. In this case, the reception end can be aware of the location of each antenna port based on the received port indexes in accordance with a predefined antenna port indexing method.

Alternatively, if a plurality of antennas port indexing method has been predefined as in the example of FIG. 18, the eNB may transmit information indicative of a selected antenna port indexing method of the plurality of predefined antennas port indexing methods and antenna port indexes to the reception end along with the size of all of antenna port arrays. In this case, the reception end can be aware of the location of each antenna port based on the received port index in accordance with the antenna port indexing method selected by the eNB.

B) Method 2: an eNB may write (generate) a bitmap based on information of M_a, N_a and P transmitted from the eNB to a reception end or previously agreed between the eNB and the reception end and the aforementioned partial-port mapping option, and may transmit the bitmap to the reception end. The eNB may notify the reception end of the location of an antenna port to which a CSI-RS has been mapped using the bitmap.

In this case, if a specific antenna port indexing method has been predefined as in the example of FIG. 18, the eNB may generate the bitmap based on a predefined antenna port indexing method. That is, in the bitmap, the location of a bit may indicate the index of each antenna port. The location of each antenna port may be determined based on the port index. Furthermore, in the bitmap, the value of a bit may indicate whether a corresponding antenna port is used for a CSI-RS.

Alternatively, if a plurality of antennas port indexing methods has been predefined as in the example of FIG. 18, the eNB may also transmit information indicative of a selected antenna port indexing method of the plurality of predefined antennas port indexing methods to the reception end. The information may be transmitted through a predetermined specific bit within the bitmap.

C) Method 3: in the case of the example of FIG. 15, what antenna port indexes are designated to '/' antenna ports in which a CSI-RS is transmitted clockwise or counterclockwise based on the antenna port at the (0,0,0) location may be previously defined and known to both an eNB and a reception end, or a corresponding direction may be set for the reception end through a 1-bit indicator.

In this case, the '\' antenna port index may be assigned an index of the last port number or may be indexed as the first number (first) after the indexing of the '/' antenna ports is completed. Next, the '/' antenna ports may be indexed using the aforementioned method.

Furthermore, if the '\' antenna port is plural (FIG. 15(*b*), FIG. 15(*c*) and FIG. 15(*d*)), it may be explicitly extended to the above method, thereby enabling antenna port indexing. That is, the '/' antenna ports may be indexed after the '\' antenna ports having a relatively small number are first indexed, and the vice versa.

Likewise, in the case of a co-polarization antenna system, what the antenna port indices of antenna ports in which a CSI-RS is transmitted based on the antenna port at the (0,0) location are designated clockwise or counterclockwise may be previously defined and known to both an eNB and a reception end or the direction may be set for the reception end through a 1-bit indicator. In this case, (x, y) indicates a row and column in the orthogonal coordinate system.

D) Method 4: in FIG. 16 or 17, the eNB may agree with the reception end about the value of a step size μ and instance information or may notify the reception end of them.

In this case, the location of an antenna port used for CSI-RS transmission in a 2D antenna array may be determined based on a value of the step size μ.

Furthermore, the instance information may include period information of an instance, information about how many times of an instance are present and/or interval information regarding that a uniform mapping pattern of antenna ports is shifted in the row/column direction whenever each instance is changed.

Accordingly, the reception end can be aware of a uniform mapping pattern suitable for each instance.

What antenna port indices are sequentially assigned to the '/' antenna ports in which a CSI-RS is transmitted based on the antenna port at the (0,0,0) location in the horizontal direction (row) or the vertical direction (column) may be previously defined and known to both the eNB and the reception end, or the direction may be set for the reception end through a 1-bit indicator.

The reception end may check the location of an antenna port in which a CSI-RS is transmitted in all of 2D antenna port arrays through the above step size information, and may be aware of the port index of an antenna port in which each CSI-RS is transmitted in an indexing direction that has been predefined or signaled by the eNB.

If a CSI-RS is mapped to the (0,0,0) location, an '/' antenna port first located in the horizontal direction or vertical direction based on the (0,0,0) location is designated as a No. 1 antenna port (i.e., assigns a port index No. 1).

In this case, as in the example of FIG. 18, antenna port indices may be sequentially assigned to '/' antenna ports in which a CSI-RS is transmitted according to the detailed port indexing method described in the full-port mapping. In this case, what which port indexing method is used may be previously defined and previously known between the eNB and the reception end, or the reception end may be notified of a port indexing method through information indicative of a port indexing method used.

Furthermore, as in the example of FIG. 18, the detailed port indexing method described in the full-port mapping may also be applied. That is, as in the example of FIG. 18, a port index may be assigned to each antenna port within all of the 2D antenna port arrays, and the UE may be aware of the port index of an antenna port used for CSI-RS transmission which is determined based on a value of the step size μ.

An index of the last port number may be assigned to the '\' antenna port after the indexing of the '/' antenna ports is completed, or the '/' antenna ports may be indexed according to the aforementioned method after a No. 1 port index is first assigned to the '\' antenna port.

Meanwhile, in the case of the second instance of FIG. 17(*b*) and the fourth instance of FIG. 17(*d*), what antenna port indices are sequentially assigned to the '\' antenna ports in which a CSI-RS is transmitted based on the antenna port at the (0,0,0) location in the horizontal direction (row) or the vertical direction (column) may be previously defined and known to both the eNB and the reception end, or the direction may be set for the reception end through a 1-bit indicator. The reception end may check the location of an antenna port in which a CSI-RS is transmitted in all of the 2D antenna port arrays through the above step size information, and may be aware of the port index of an antenna port in which each CSI-RS is transmitted in the indexing direction that has been predefined or signaled by the eNB.

If a CSI-RS is not mapped to the (0,0,1) location, a '\' antenna port first located in the horizontal direction or the vertical direction based on the (0,0,1) location is designated as a No. 1 antenna port (i.e., assign a port index No. 1).

In this case, as in the example of FIG. 18, antenna port indices may be sequentially assigned to the '\' antenna ports in which a CSI-RS is transmitted according to the detailed port indexing method described in the full-port mapping. In this case, what which port indexing method is used may be previously defined and previously known between the eNB and the reception end, or the reception end may be notified of a port indexing method through information indicative of a port indexing method used.

In this case, as in the example of FIG. 18, the detailed port indexing method described in the full-port mapping may also be applied. That is, as in the example of FIG. 18, a port index is assigned to each of the antenna ports within all of the 2D antenna port arrays, and the UE may be aware of the port index of an antenna port used for CSI-RS transmission which has been determined based on a value of the step size μ.

In the case of the '/' antenna port, an index of the last port number may be assigned to the '/' antenna port after the indexing of the '\' antenna ports is completed, or the '\' antenna port may be indexed according to the aforementioned method after a No. 1 port index is first assigned to the '/' antenna port.

In the case of a co-polarization antenna system, what the antenna port indices of antenna ports in which a CSI-RI is transmitted based on the antenna port at the (0,0) location are designated clockwise or counterclockwise may be previously defined and known to both an eNB and a reception end or the direction may be set for the reception end through a 1-bit indicator.

In the aforementioned M_a, N_a and P information and/or the CSI-RS mapping methods, the eNB may notify the reception end of required information (e.g., port index information and/or location information) through high layer signaling (e.g., RRC signaling). Such signaling may use a fixed value in the eNB or may be semi-statically set.

Furthermore, the eNB may notify the reception end of the selection of the full-port/partial-port mapping method of the CSI-RS port mapping methods using a 1-bit indicator through high layer signaling (e.g., RRC signaling).

Furthermore, the aforementioned various full-port mapping methods and/or partial-port mapping methods may be previously defined. The eNB may notify the reception end of a selected full-port mapping method and/or partial-port mapping method of them through high layer signaling (e.g., RRC signaling).

Table 6 shows an example of an n-bit indicator.

TABLE 6

|  | Bit representation | Remark |
| --- | --- | --- |
| 1 bit | 0 | Full-port mapping: Method 1 |
|  | 1 | Partial-port mapping: Option 1 |
| 2 bits | 00 | Full-port mapping: Method 1 |
|  | 01 | Full-port mapping: Method 2 |
|  | 10 | Partial-port mapping: Option 1 |
|  | 11 | Partial-port mapping: Option 5 |
| 3 bits | 000 | Full-port mapping: Method 1 |
|  | 001 | Full-port mapping: Method 2 |
|  | 010 | Partial-port mapping: Option 1 |
|  | 011 | Partial-port mapping: Option 2 |
|  | 100 | Partial-port mapping: Option 3 |
|  | 101 | Partial-port mapping: Option 4 |
|  | 110 | Partial-port mapping: Option 5 |
|  | 111 | partial port mapping: Option 6 |

Table 6 is only one example in which the reception end can be notified of the selection of the full-port/partial-port mapping method, a method selected by the eNB from among various predefined full-port mapping methods and/or an option selected by the eNB from among various predefined partial-port mapping options using n bits, and the present invention is not limited thereto.

FIG. 19 is a diagram illustrating a channel measurement method according to an embodiment of the present invention.

Referring to FIG. 19, an eNB may transmit CSI-RS port mapping method information to a UE (S1901).

The CSI-RS port mapping method information may indicate whether the aforementioned full-port mapping method is applied or whether the partial-port mapping method is applied in order to transmit a CSI-RS.

Furthermore, the CSI-RS port mapping method information may indicate a full-port mapping method and/or partial-port mapping method selected by the eNB from among various full-port mapping methods and/or partial-port mapping methods as in the example of Table 6.

In this case, if any one method of the full-port mapping methods and the partial-port mapping methods is defined in order to transmit the CSI-RS, step S1901 may be omitted.

The eNB may transmit antenna port array size information and mapping information between the CSI-RS and an antenna port to the UE (S1902).

In this case, the antenna port array size information may include the aforementioned M_a, N_a and P information.

Furthermore, mapping information between a CSI-RS and an antenna port means information for identifying an antenna port used to transmit a CSI-RS. The mapping information between a CSI-RS and an antenna port may include index information of an antenna port used to transmit a CSI-RS, location information of an antenna port used to transmit the CSI-RS and/or step size information indicative of an interval between antenna ports used to transmit the CSI-RS.

In this case, if an antenna port used to transmit a CSI-RS is previously defined and identified by a UE, step S1902 may be omitted.

Furthermore, although not illustrated in FIG. 19, the aforementioned information may also be additionally transmitted to the UE depending on an embodiment of the present invention. For example, if a CSI-RS port mapping method is different for each instance as in the examples of FIG. 16 or 17, information for identifying an antenna port used to transmit a CSI-RS for each instance and/or instance information may be additionally transmitted to the UE.

The eNB transmits a CSI-RS on all of antenna ports (e.g., a 2D antenna port array) or an antenna port that belongs to all of the antenna port and that is used to transmit a CSI-RS to the UE (S1903).

In this case, an antenna port located in the row or column of a boundary within the 2D antenna port array may be used for the transmission of the reference signal.

In this case, if the 2D antenna port array is a cross-polarization antenna system, a first polarization antenna port located in the row or column of a boundary within the 2D antenna port array may be used for the transmission of the reference signal. Furthermore, one or more vertexes within the 2D antenna port array or a second polarization antenna port located in the column of a specific boundary or the row of a specific boundary may be used for the transmission of the reference signal.

Furthermore, an antenna port distant at a specific interval in the same row or column within the 2D antenna port array may be used for the transmission of the reference signal.

In this case, if the 2D antenna port array is a cross-polarization antenna system, a first polarization antenna port distant at a specific interval in the same row or column within the 2D antenna port array may be used for the transmission of the reference signal. Furthermore, one or more vertexes within the 2D antenna port array or a second polarization antenna port located in the column of a specific boundary or the row of a specific boundary may be used for the transmission of the reference signal.

In this case, an antenna port at a different location within the 2D antenna port array for each instance may be used for the transmission of the reference signal. For example, the location of an antenna port used for the transmission of the reference signal within the 2D antenna port array may be shifted at a specific interval in a row or column whenever an instance is changed.

The description of an antenna port used by the eNB in order to transmit a CSI-RS is the same as the according to the aforementioned embodiment of the present invention, and thus a detailed description thereof is omitted.

The UE measures a channel (or measures and reconstructs) based on the CSI-RS received from the eNB (S1904).

If the CSI-RS is transmitted on some antenna ports, the UE may reconstruct a channel for all of antenna ports by measuring a channel on some antenna ports and reconstructing a channel for an antenna port not used for the transmission of the reference signal within all the antenna ports using the channel measurement result.

In this case, the channel for the antenna port not used for the transmission of the reference signal may be reconstructed by interpolating or extrapolating the channel measurement result.

In the case of a cross-polarization antenna system, a channel for a first polarization antenna port not used for the transmission of the reference signal may be reconstructed using a channel measurement result for the first polarization antenna port used for the transmission of the reference signal, and channels for all of second polarization antenna ports may be reconstructed using the reconstructed channels for all of the first polarization antenna ports and a channel for the second polarization antenna port.

Furthermore, if an antenna port at a different location within the 2D antenna port array is used for the transmission of a reference signal for each instance, a channel for an antenna port not used for the transmission of the reference signal is reconstructed by interpolating or extrapolating the channel measurement result for each instance, thereby being capable of reconstructing channels for all of antenna ports within the 2D antenna port array.

In this case, in the case of a cross-polarization antenna system, a channel for a first polarization antenna port not used for the transmission of the reference signal may be reconstructed using a channel measuring result for a first polarization antenna port used for the transmission of a reference signal for each instance, and channels for all of second polarization antenna ports may be reconstructed using the reconstructed channels for all of the first polarization antenna ports and a channel for the second polarization antenna port.

Furthermore, an instant channel covariance matrix may be computed using the reconstructed channels for all the antenna ports for each instance, and a sample channel covariance matrix may be corrected by updating the instant channel covariance matrix.

The description of a method of measuring or reconstructing, by the UE, the channels for all the antenna ports based on the received CSI-RS is the same as that according to the aforementioned embodiment of the present invention, and thus a detailed description thereof is omitted.

The UE reports channel state information to the eNB (S1905).

In this case, the channel state information may mean information related to quality of a measured (reconstructed) channel, and may include a CQI, a PMI and/or an RI.

General Apparatus to which the Present Invention May be Applied

FIG. 20 illustrates a block diagram of a wireless communication apparatus according to an embodiment of the present invention.

Referring to FIG. 20, the wireless communication system includes a base station (eNB) 2010 and a plurality of user equipments (UEs) 2020 located within the region of the eNB 2010.

The eNB 2010 includes a processor 2011, a memory 2012 and a radio frequency unit 2013. The processor 2011 implements the functions, processes and/or methods proposed in FIGS. 1 to 19 above. The layers of wireless interface protocol may be implemented by the processor 2011. The memory 2012 is connected to the processor 2011, and stores various types of information for driving the processor 2011. The RF unit 2013 is connected to the processor 2011, and transmits and/or receives radio signals.

The UE 2020 includes a processor 2021, a memory 2022 and a radio frequency unit 2023. The processor 2021 implements the functions, processes and/or methods proposed in FIGS. 1 to 19 above. The layers of wireless interface protocol may be implemented by the processor 2021. The memory 2022 is connected to the processor 2021, and stores various types of information for driving the processor 2021. The RF unit 2023 is connected to the processor 2021, and transmits and/or receives radio signals.

The memories 2012 and 2022 may be located interior or exterior of the processors 2011 and 2021, and may be connected to the processors 2011 and 2021 with well known means. In addition, the eNB 2010 and/or the UE 2020 may have a single antenna or multiple antennas.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

A method of transmitting a reference signal to a method for measuring a channel in a wireless communication system of the present invention has been described based on an example applied to the 3GPP LTE/LTE-A systems, but may be applied to various wireless communication systems in addition to the 3GPP LTE/LTE-A systems.

The invention claimed is:

1. A method for a user equipment (UE) to measure a channel in a wireless communication system, the method comprising:
   receiving, from a base station (BS), a reference signal on part of antenna ports within a cross-polarization two-dimensional (2D) antenna port array,
   wherein the cross-polarization 2D antenna port array comprises first polarization antenna ports and second polarization antenna ports,
   wherein the antenna ports transmitting the reference signal are part of the first polarization antenna ports;
   measuring a channel for the part of antenna ports based on the reference signal; and
   reconstructing channels for all of antenna ports within the 2D antenna port array by reconstructing a channel for an antenna port not used for the transmission of the reference signal within the 2D antenna port array using the channel measurement result.

2. The method of claim 1, wherein an antenna port located in a row or column of a boundary within the 2D antenna port array is used for the transmission of the reference signal.

3. The method of claim 1, wherein the channel for the antenna port not used for the transmission of the reference signal is reconstructed by interpolating or extrapolating the channel measurement result.

4. The method of claim 1, wherein the antenna ports transmitting the reference signal are part of the first polarization antenna ports and parts of the second polarization antenna ports,
   wherein the second polarization antenna ports located at one or more vertexes or in a column of a specific boundary or a row of a specific boundary within the 2D antenna port array is used for the transmission of the reference signal.

5. The method of claim 4, wherein:
   a channel for a first polarization antenna port not used for the transmission of the reference signal is reconstructed using the channel measurement, and
   channels for all of the second polarization antenna ports are reconstructed using the reconstructed channels for all of the first polarization antenna ports and a channel for the second polarization antenna port.

6. The method of claim 1, wherein an antenna port distant at a specific interval in an identical row or column within the 2D antenna port array is used for the transmission of the reference signal.

7. The method of claim 6, wherein an antenna port at a different location within the 2D antenna port array for each instance is used for the transmission of the reference signal.

8. The method of claim 7, wherein a location of the antenna port used for the transmission of the reference signal within the 2D antenna port array is shifted at a specific interval in the row or column whenever the instance is changed.

9. The method of claim 7, wherein channels for all of antenna ports within the 2D antenna port array are reconstructed by reconstructing the channel for the antenna port not used for the transmission of the reference signal by interpolating or extrapolating the channel measurement result for each instance.

10. The method of claim 9, wherein an instant channel covariance matrix is computed using the reconstructed channels for all of antenna ports for each instance, and a sample channel covariance matrix is corrected by updating the instant channel covariance matrix.

11. The method of claim 6, wherein the antenna ports transmitting the reference signal are part of the first polarization antenna ports and part of the second polarization antenna ports,
   wherein the second polarization antenna ports located at one or more vertexes or in a column of a specific boundary or a row of a specific boundary within the 2D antenna port array is used for the transmission of the reference signal.

12. The method of claim 11, wherein:
   a channel for a first polarization antenna port not used for the transmission of the reference signal is reconstructed using a channel measurement result, and
   channels for all of the second polarization antenna ports are reconstructed using the reconstructed channels for all of the first polarization antenna ports and the channel for the second polarization antenna port.

13. The method of claim 1, further comprising receiving a size of the 2D antenna port array and a location and index of the part of antenna ports used to transmit the reference signal within the 2D antenna port array from the BS.

14. The method of claim 1, further comprising receiving a size of the 2D antenna port array and an interval size of the antenna port used for the transmission of the reference signal in an identical row or column within the 2D antenna port array from the BS.

15. The method of claim 14, wherein antenna port indices are sequentially assigned to antenna ports determined based on the interval size and used for the transmission of the reference signal in a vertical direction or horizontal direction.

16. A user equipment (UE) for measuring a channel in a wireless communication system, the UE comprising:
   a radio frequency (RF) unit for transmitting and receiving a radio signal; and
   a processor controlling the RF unit,
   wherein the processor is configured to:
   receive, from a base station (BS), a reference signal on part of antenna ports within a cross-polarization two-dimensional (2D) antenna port array,
   wherein the cross-polarization 2D antenna port array comprises first polarization antenna ports and second polarization antenna ports,
   wherein the antenna ports transmitting the reference signal are part of the first polarization antenna ports,
   measure a channel for the part of antenna ports based on the reference signal, and
   reconstruct channels for all of antenna ports within the 2D antenna port array by reconstructing a channel for an antenna port not used for the transmission of the reference signal within the 2D antenna port array using the channel measurement result.

* * * * *